United States Patent
Ahn et al.

(10) Patent No.: US 9,398,482 B2
(45) Date of Patent: Jul. 19, 2016

(54) APPARATUS AND METHOD FOR CONTROLLING IN-DEVICE COEXISTENCE INTERFERENCE IN WIRELESS COMMUNICATION SYSTEM

(71) Applicant: PANTECH Co., Ltd., Seoul (KR)

(72) Inventors: Jae Hyun Ahn, Seoul (KR); Ki Bum Kwon, Seoul (KR); Myung Cheul Jung, Seoul (KR)

(73) Assignee: Pantech Co., Ltd., Seoul (KR)

( * ) Notice: Subject to any disclaimer, the term of this patent is extended or adjusted under 35 U.S.C. 154(b) by 64 days.

(21) Appl. No.: 14/356,584

(22) PCT Filed: Nov. 7, 2012

(86) PCT No.: PCT/KR2012/009293
§ 371 (c)(1),
(2) Date: May 6, 2014

(87) PCT Pub. No.: WO2013/069950
PCT Pub. Date: May 16, 2013

(65) Prior Publication Data
US 2014/0301235 A1   Oct. 9, 2014

(30) Foreign Application Priority Data
Nov. 7, 2011 (KR) .................. 10-2011-0115428

(51) Int. Cl.
*H04L 1/00* (2006.01)
*H04W 24/10* (2009.01)
(Continued)

(52) U.S. Cl.
CPC ............ *H04W 24/10* (2013.01); *H04L 1/0026* (2013.01); *H04L 1/0027* (2013.01); *H04W 16/14* (2013.01); *H04W 36/0083* (2013.01); *H04W 88/06* (2013.01)

(58) Field of Classification Search
USPC .......... 370/331–336, 252–328; 455/422–436, 455/452–501
See application file for complete search history.

(56) References Cited

U.S. PATENT DOCUMENTS 8,805,303 B2 * 8/2014 Koo ................ H04W 16/14
370/310
8,842,546 B2 * 9/2014 Chen ................ H04W 36/08
370/241
(Continued)

OTHER PUBLICATIONS

International Search Report dated on Mar. 21, 2013 in International Patent Application No. PCT/KR2012/009293.
(Continued)

*Primary Examiner* — Man Phan
(74) *Attorney, Agent, or Firm* — H.C. Park & Associates, PLC

(57) ABSTRACT

Method and apparatus of controlling In-Device Coexistence interference in a wireless communication system are described. The present invention comprises receiving measurement configuration information, comprising an IDC triggering threshold, from a base station; performing measurement considering IDC influence in a serving cell and measurement not considering IDC influence in a neighbor cell based on the measurement configuration information; triggering the IDC event if a difference between a result of the measurement considering IDC influence and a result of the measurement not considering IDC influence is greater than the IDC triggering threshold; and transmitting measurement report information, comprising IDC indication, to the base station.

17 Claims, 19 Drawing Sheets

(51) Int. Cl.
*H04W 16/14* (2009.01)
*H04W 88/06* (2009.01)
*H04W 36/00* (2009.01)

(56) References Cited

U.S. PATENT DOCUMENTS

| | | | | |
|---|---|---|---|---|
| 8,923,862 B2* | 12/2014 | Jang | ............ | H04W 24/10 370/328 |
| 9,088,924 B2* | 7/2015 | Fu | ............ | H04W 36/20 370/338 |
| 2011/0170418 A1* | 7/2011 | Sagfors | ............ | H04W 36/0083 370/241 |
| 2012/0195298 A1* | 8/2012 | Kuo | ............ | H04W 4/06 370/338 |
| 2012/0275362 A1* | 11/2012 | Park | ............ | H04W 74/02 370/311 |
| 2013/0114516 A1* | 5/2013 | Koo | ............ | H04B 15/00 370/329 |
| 2013/0208641 A1* | 8/2013 | Baghel | ............ | H04B 1/109 370/311 |
| 2014/0010205 A1* | 1/2014 | Sebire | ............ | H04W 36/0083 370/331 |
| 2014/0228018 A1* | 8/2014 | Zhang | ............ | H04W 24/08 455/425 |

OTHER PUBLICATIONS

LG Electronics Inc., "Necessary procedure for avoiding ping-pong to problematic frequency", R2-115430, 3GPP TSG RAN2 Meeting #75bis, Oct. 10-14, 2011, Zhuhai, China.

Huawei, et al., "Considerations on IDC indication", R2-114884, 3GPP TSG-RAN WG2 Meeting #75bis, Oct. 10-14, 2011, Zhuhai, China.

3GPP TR 36.816 V11.1.0, "Study on signaling and procedure for interference avoidance for in-device coexistence", Sep. 30, 2011, Valbonne, France.

* cited by examiner

APPARATUS AND METHOD FOR CONTROLLING IN-DEVICE COEXISTENCE INTERFERENCE IN WIRELESS COMMUNICATION SYSTEM

CROSS REFERENCE TO RELATED APPLICATIONS

This application is the National Stage Entry of International Application PCT/KR2012/009293, filed on Nov. 7, 2012, and claims priority from and the benefit of Korean Patent Application No. 10-2011-0115428 filed on Nov. 7, 2011, both of which are incorporated herein by reference for all purposes as if fully set forth herein.

BACKGROUND

1. Field

The present invention relates to a wireless communication system, and more particularly, to an apparatus and a method for controlling in-device coexistence interference in a wireless communication system.

2. Discussion of the Background

A wireless communication system generally uses one bandwidth for transmitting data. For example, a 2-generation wireless communication system uses a bandwidth in the range of 200 KHz to 1.25 MHz and a 3-generation wireless communication system uses a bandwidth in the range of 5 MHz to 10 MHz. In order to support an increased transmission capacity, 3rd generation partnership project (3GPP) long term evolution (LTE) or IEEE 802.16 m has extended a bandwidth thereof up to 20 MHz or more in recent years. The bandwidth may need to increase so as to increase the transmission capacity, but supporting a large bandwidth even when a required service level is low may cause large power consumption.

Therefore, a multiple component carrier system has appeared, which defines a carrier having one bandwidth and one center frequency, and can transmit or receive data in a wideband through a plurality of carriers. A narrowband and the wideband are simultaneously supported by using one or more carriers. For example, when one carrier corresponds to a bandwidth of 5 MHz, a bandwidth of maximum 20 MHz is supported by using four carriers.

Due to a ubiquitous connection network of today, user can access different networks in different regions and continuously keep connectivity wherever. In the related art in which one terminal communicates with one network system, the user carried different equipments supporting respective network systems. However, in recent years, as functions of a single terminal have been advanced and complicated, the user can communicate with a plurality of network systems simultaneously by using only the single terminal and user convenience has increased.

However, when one terminal performs communication on a plurality of network system bands simultaneously, In-Device Coexistence interference (IDC) may occur. The in-device coexistence interference (IDC) means interference when transmission in any one frequency band interferes in reception in another frequency band. For example, the in-device coexistence interference may occur between a Bluetooth system band and a 802.16 system band when one terminal supports both a Bluetooth system and a 802.16 system. The in-device coexistence interference may occur primarily when a spacing interval of a frequency band boundary of a heterogeneous network system is not sufficiently large. In this regard, various in-device coexistence interference avoidance (ICO) techniques are proposed.

SUMMARY

An object of the present invention is to provide an apparatus and method for controlling IDC interference.

Another object of the present invention is to provide an apparatus and method in which a serving cell and a neighbor cell perform measurement in order to perform an operation for controlling IDC interference.

Yet another object of the present invention is to provide an apparatus and method for triggering an event that indicates the occurrence or end of IDC interference using the existing event trigging threshold.

In accordance to an example of the present invention, a method of user equipment controlling In-Device Coexistence (IDC) interference in a wireless communication system comprises receiving measurement configuration information, comprising an IDC triggering threshold used as a condition that an IDC event indicating that an on-going IDC interference state has started is triggered, from a base station; performing measurement considering IDC influence in a serving cell and measurement not considering IDC influence in a neighbor cell is based on the measurement configuration information; triggering the IDC event if a difference between a result of the measurement considering IDC influence and a result of the measurement not considering IDC influence is greater than the IDC triggering threshold; and transmitting measurement report information, comprising IDC indication indicating whether the IDC event has been triggered or not and the result of the measurement considering IDC influence or the result of the measurement not considering IDC influence, to the base station.

In accordance to another example of the present invention, a method of a base station controlling In-Device Coexistence (IDC) interference in a wireless communication system comprises transmitting measurement configuration information, comprising an IDC triggering threshold used as a condition that an IDC event indicating that an on-going IDC interference state has started is triggered, to user equipment; receiving measurement report information, comprising IDC indication indicating whether the IDC event has been triggered or not and a result of measurement considering IDC influence, performed in a serving cell, or a result of measurement not considering IDC influence, performed in a neighbor cell from the user equipment; determining an In-device Coexistence interference coOrdination (ICO) scheme based on the measurement report information; and transmitting the ICO scheme to the user equipment.

In accordance to yet another example of the present invention, a user equipment for controlling In-Device Coexistence (IDC) interference in a wireless communication system comprises a reception unit configured to receive measurement configuration information, comprising an IDC triggering threshold used as a condition that an IDC event indicating that an on-going IDC interference state has started is triggered, from a base station; a measurement unit configured to perform measurement considering IDC influence in a serving cell and measurement not considering IDC influence in a neighbor cell based on the measurement configuration information; a triggering unit configured to trigger the IDC event if a difference between a result of the measurement considering IDC influence and a result of the measurement not considering IDC influence is greater than the IDC triggering threshold; and a transmission unit configured to transmit measurement report information, comprising IDC indication indicating whether the IDC event has been triggered or not and the result of the measurement considering IDC influence or the result of the measurement not considering IDC influence, to the base station.

In accordance to yet another example of the present invention, a base station for controlling In-Device Coexistence (IDC) interference in a wireless communication system comprises a transmission unit configured to transmit measurement configuration information, comprising an IDC triggering threshold used as a condition that an IDC event indicating that an on-going IDC interference state has started is triggered, to user equipment; a reception unit configured to receive measurement report information, comprising IDC indication indicating whether the IDC event has been triggered or not and a result of measurement considering IDC influence, performed in a serving cell, or a result of measurement not considering IDC influence, performed in a neighbor cell from the user equipment; and an interference coordination determination unit configured to determine an In-device Coexistence interference coOrdination (ICO) scheme based on the measurement report information.

In accordance with the present invention, an event to indicate the occurrence and end of IDC interference can be indicated in a wireless network.

In accordance with the present invention, an operation can be performed so that the occurrence of IDC interference can be avoided.

In accordance with the present invention, triggering can be properly performed so that an operation of controlling IDC interference is not performed so frequently or too little.

DETAILED DESCRIPTION OF THE ILLUSTRATED EMBODIMENTS

Figure 1:
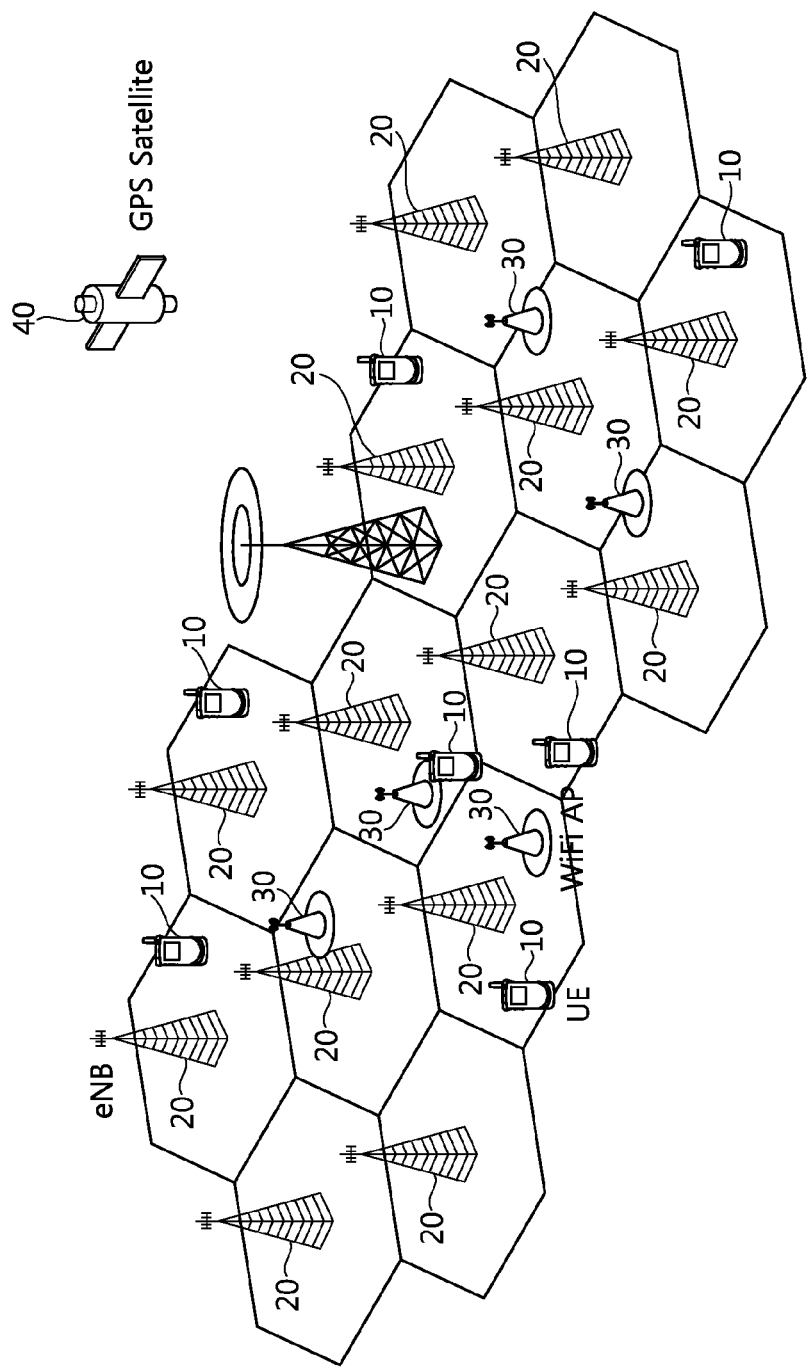
FIG. 1 illustrates a wireless communication system according to exemplary embodiments of the present invention.

Hereinafter, in this specification, some exemplary embodiments will be described in detail with reference to the accompanying drawings. In adding reference numerals to components throughout the drawings, it is to be noted that like reference numerals designate like components even though components are shown in different drawings. Further, in describing the present invention, well-known functions or constructions will not be described in detail since they may unnecessarily obscure the understanding of the present invention.

Further, in describing components of the specification, terms such as first, second, A, B, (a), (b), and like may be used. These terms are just used to discriminate the components from other components and a property, an order, or a sequence of the corresponding component is not limited by the term. It will be understood that when an element is simply referred to as being "connected to" or "coupled to" another element without being "directly connected to" or "directly coupled to" another element in the present description, it may be "directly connected to" or "directly coupled to" another element or be connected to or coupled to another element, having the other element intervening there between.

FIG. 1 illustrates a wireless communication system according to exemplary embodiments of the present invention.

Referring to FIG. 1, the wireless communication system is widely placed in order to provide various communication services including voice, packet, data, and the like, and includes a terminal (also may called as a user equipment (UE)) 10, a base station (BS, or called as a evolved NodeB (eNB)) 20, a wireless LAN access point (AP) 30, a global positioning system (GPS) 40, and a satellite. Herein, a wireless LAN is a device supporting IEEE 802.11 technology which a wireless standard and the IEEE 802.11 may be mixed with a WiFi system.

The UE 10 may be positioned in coverage of a plurality of networks including a cellular network, a wireless LAN broadcast network, a satellite system, and the like. The UE 10 is provided with a plurality of wireless transceivers in order to access various networks and various services regardless of place and time. For example, a smart phone is provided with long term evolution (LTE), WiFi Bluetooth transceiver, and a GPS receiver. A design of the UE 10 becomes more complicated in order to integrate more and more transceivers in one same UE 10 while maintaining excellent performance. As a result, a possibility that in-device coexistence interference (IDC) in the UE will occur may be further increased.

Hereinafter, a downlink (DL) indicates communication from the eNB 20 and an uplink (UL) indicates communication from the UE 10 to the eNB 20. In the downlink, a transmitter may be a part of the eNB 20 and a receiver may be a part of the UE 10. In the uplink, the transmitter may be a part of the UE 10 and a receiver may be a part of the eNB 20.

The UE 10 may be fixed or have mobility, and may be called other terms such as a mobile station (MS), a user terminal (UT), a subscriber station (SS), a mobile terminal (MT), a wireless device, and the like. The eNB 20 indicates a fixed station that communicates with the UE 10 and may be called other terms such as a base station (BS), a base transceiver system (BTS), an access point, a femto base station (BS), a relay, and the like.

Multiple access techniques applied to the wireless communication system are not limited. Various multiple access techniques such as CDMA (Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, and OFDM-CDMA may be used. In uplink transmission and downlink transmission, a time division duplex (TDD) scheme in which transmission is performed by using different times may be used or a frequency division duplex (FDD) scheme in which transmission is performed by using different frequencies may be used.

Figure 2:
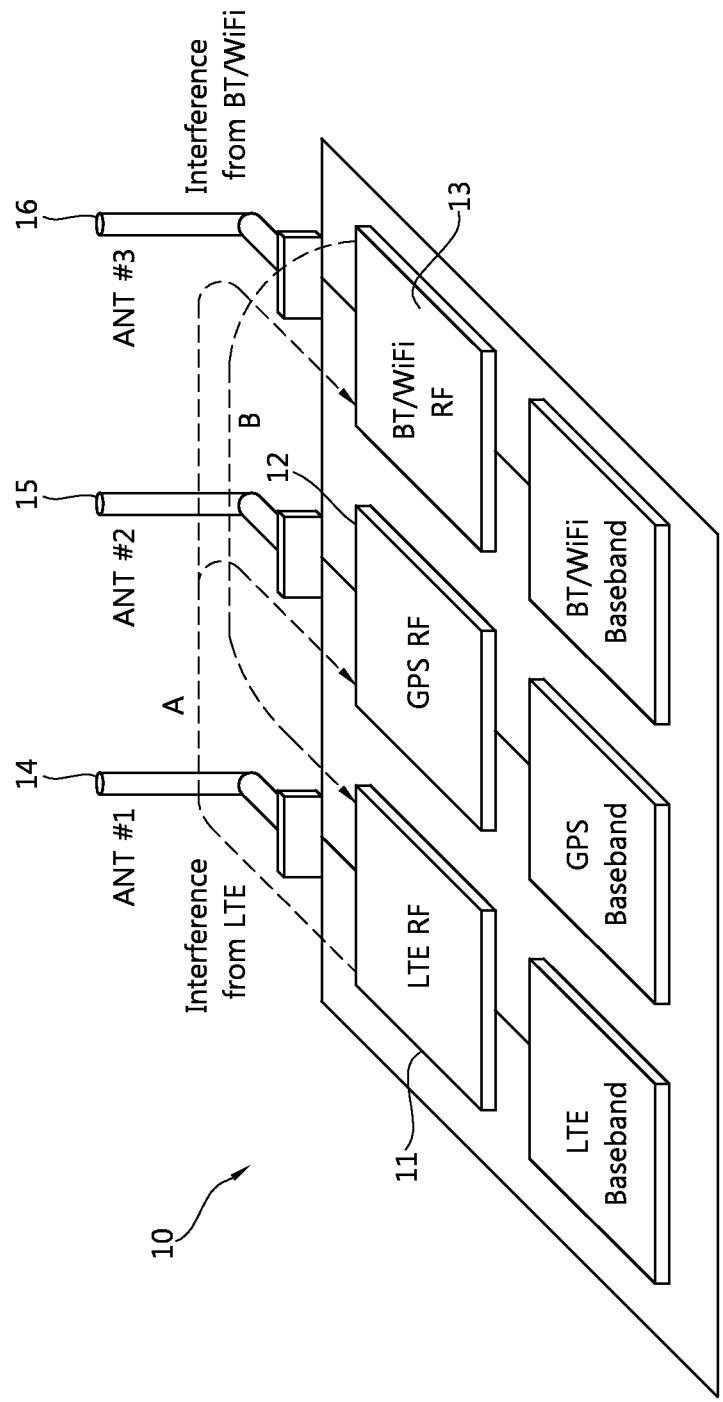
FIG. 2 is an explanatory diagram describing in-device coexistence interference.

FIG. 2 is an explanatory diagram describing in-device coexistence interference.

Referring to FIG. 2, the eNB 20 includes an LTE RF 21, a GPS RF 22, and a Bluetooth/WiFi RF 23. Transceiving antennas 24, 25, and 26 are connected to the respective RFs. That is, various types of RFs are closely mounted in one device platform. Herein, transmission power of one RF may be much larger than a reception power level into another RF receiver. In this case, if an interval in frequency between the RFs is not sufficient and a filtering technique is not supported, a transmission signal of any RF may cause remarkable interference in a receiver of another RF within the device. For example, "(1)" is an example in which the transmission signal of the LTE RF 21 causes the in-device coexistence interference in the GPS RF 22 and the Bluetooth/WiFi RF 23 and "(2)" is an example in which the transmission signal of the Bluetooth/WiFi RF 23 causes the in-device coexistence interference in the LTE RF 21.

Figure 3:
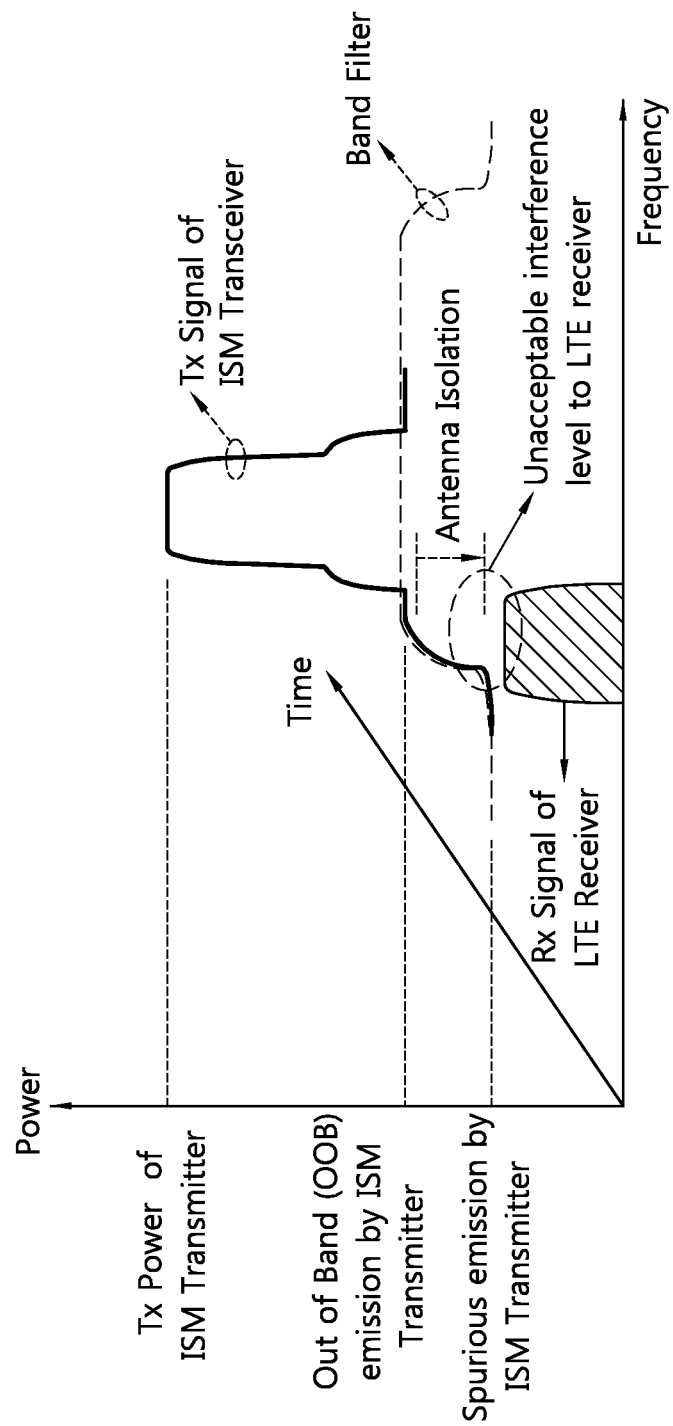
FIG. 3 is an example illustrating the in-device coexistence interference from an industrial, scientific and medical transmitter to an LTE receiver.

FIG. 3 is an example illustrating the in-device coexistence interference from an industrial, scientific and medical (ISM) transmitter to an LTE receiver. The ISM band indicates a band which may be arbitrarily used without authorizing the use in industrial, scientific, and medical fields.

Referring to FIG. 3, a band of a signal received by the LTE receiver overlaps with a band of a transmission signal of the ISM transmitter. In this case, the in-device coexistence interference may occur.

Figure 4:
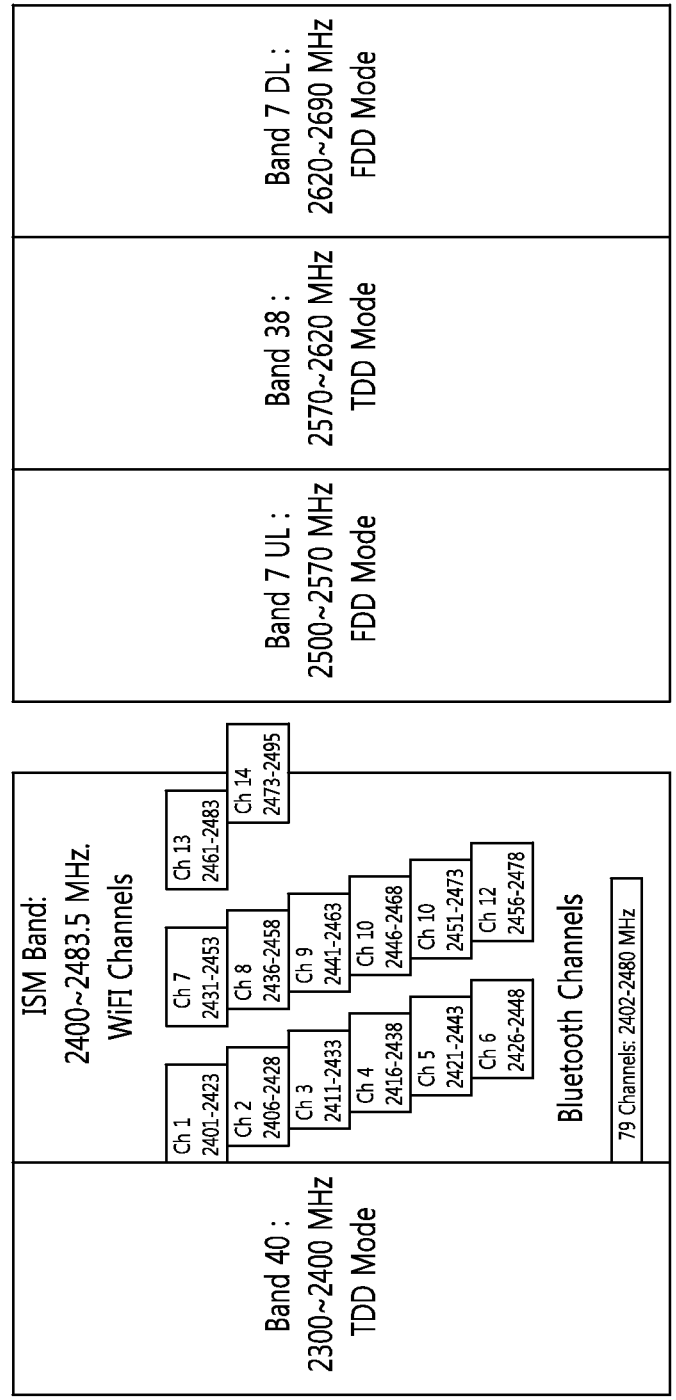
FIG. 4 is an example in which a band is divided into an ISM band and an LTE band on a frequency band.

FIG. 4 is an example in which a band is divided into an ISM band and an LTE band on a frequency band.

Referring to FIG. 4, a band 40, a band 7, and a band 38 are LTE bands. The band 40 occupies a band in the range of 2300 to 2400 MHz in a TDD mode and the band 7 occupies a band in the range of 2500 to 2570 MHz as the uplink in an FDD mode. In addition, the band 38 occupies a band in the range of 2570 to 2620 MHz in the TDD mode. Meanwhile, the ISM band is used as a WiFi channel and a Bluetooth channel, and occupies a band in the range of 2400 to 2483.5 MHz. Herein, a condition in which the in-device coexistence interference occurs is illustrated in Table 1 below.

TABLE 1

| Interference band | Pattern of interference |
| --- | --- |
| Band 40 | ISM Tx –> LTE TDD DL Rx |
| Band 40 | LTE TDD UL Tx –> ISM Rx |
| Band 7 | LTE FDD UL Tx –> ISM Rx |
| Band 7/13/14 | LTE FDD UL Tx –> GPS Rx |

Referring to Table 1, a mark of "a->b" in the interference pattern illustrates a condition in which a transmitter a causes the in-device coexistence interference to a receiver b. Therefore, in the band 40, the ISM transmitter causes the in-device coexistence interference to an LTE-band downlink TDD receiver (LTE DL TDD Rx). The in-device coexistence interference may be alleviated to some extent by a filtering scheme, but is not sufficient to alleviate the in-device coexistence interference. When a frequency division multiplex (FDM) scheme is additionally applied to the filtering scheme, the in-device coexistence interference may be more efficiently alleviated.

Figure 5:
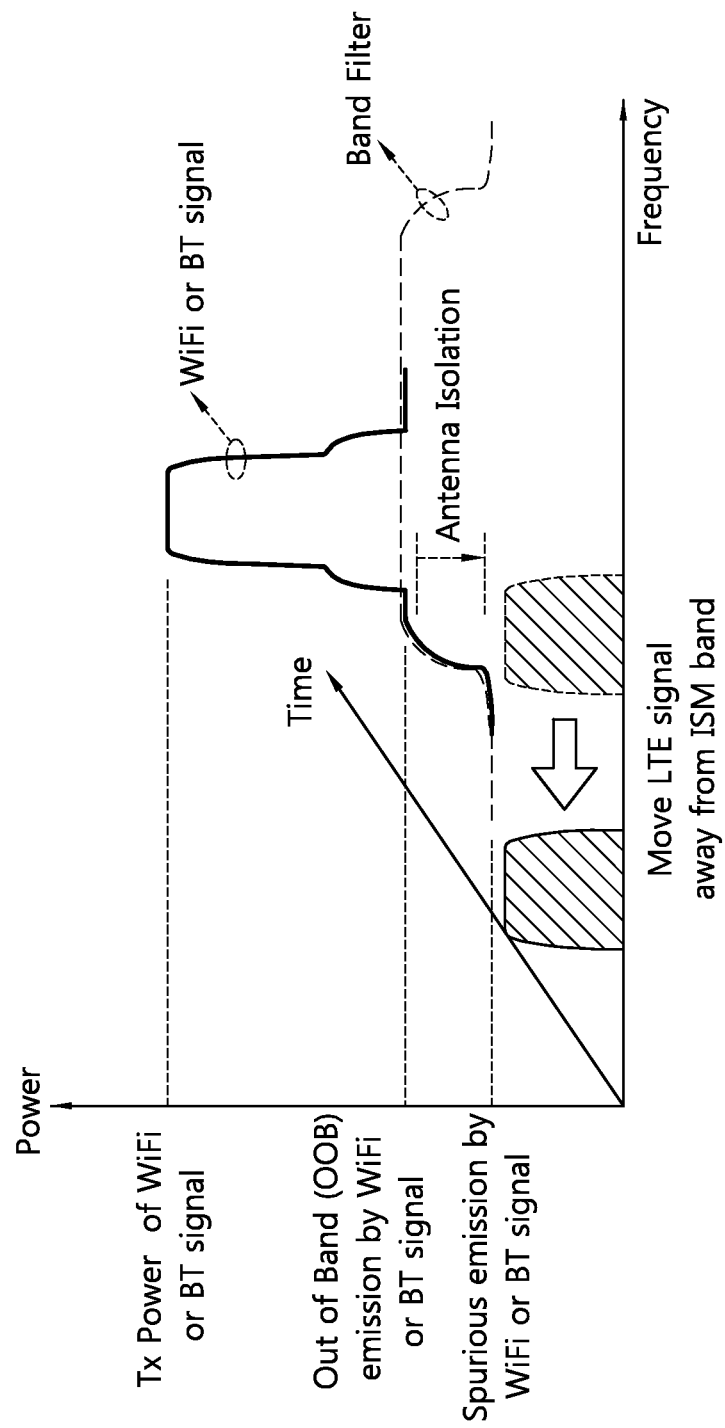
FIG. 5 is an explanatory diagram illustrating one example of alleviating the in-device coexistence interference by using an FDM scheme according to the present invention.

FIG. 5 is an explanatory diagram illustrating one example of alleviating the in-device coexistence interference by using an FDM scheme according to the present invention.

Referring to FIG. 5, the LTE band may be moved so as to prevent the LTE band and the ISM band from overlapping with each other. As a result, a handover of the terminal is induced from the ISM band. However, to this end, a method in which legacy measurement or new signaling accurately triggers a mobility procedure or a radio link failure (RLF) procedure is required. Alternatively, a part which becomes a problem associated with the ISM in the LTE band may be avoided through a filtering or resource allocation technique. Alternatively, overlapping interference may be avoided with respect to a case in which LTE carriers are compiled through a procedure of reconfiguring a set of used carriers.

Figure 6:
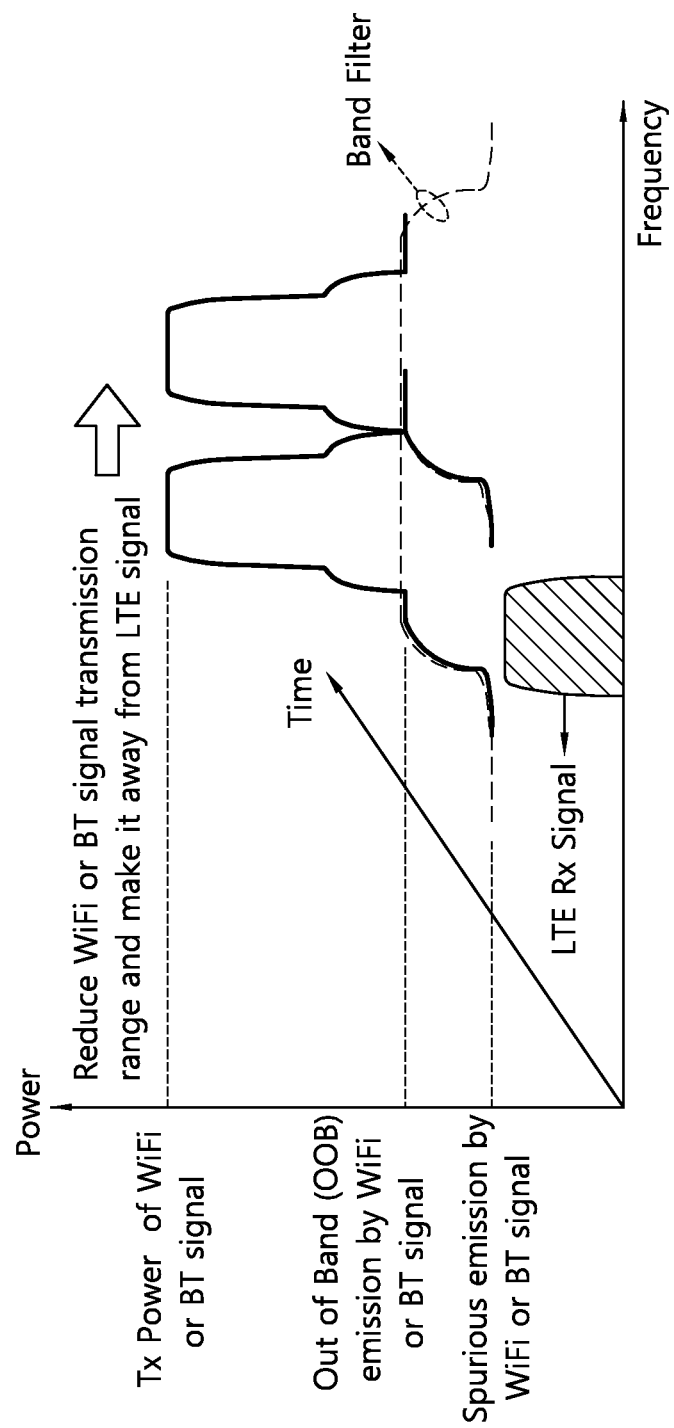
FIG. 6 is an explanatory diagram illustrating another example of alleviating the in-device coexistence interference by using the FDM scheme according to the present invention.

FIG. 6 is an explanatory diagram illustrating another example of alleviating the in-device coexistence interference by using the FDM scheme according to the present invention.

Referring to FIG. 6, the ISM band may be reduced and moved so as to be spaced apart from the LTE band. However, in this scheme, backward compatibility problem may occur. In the case of the Bluetooth, the backward compatibility problem may be resolved due to an adaptive frequency hopping mechanism to some extent, but in the case of the WiFi, it may be difficult to resolve the backward compatibility problem.

Figure 7:
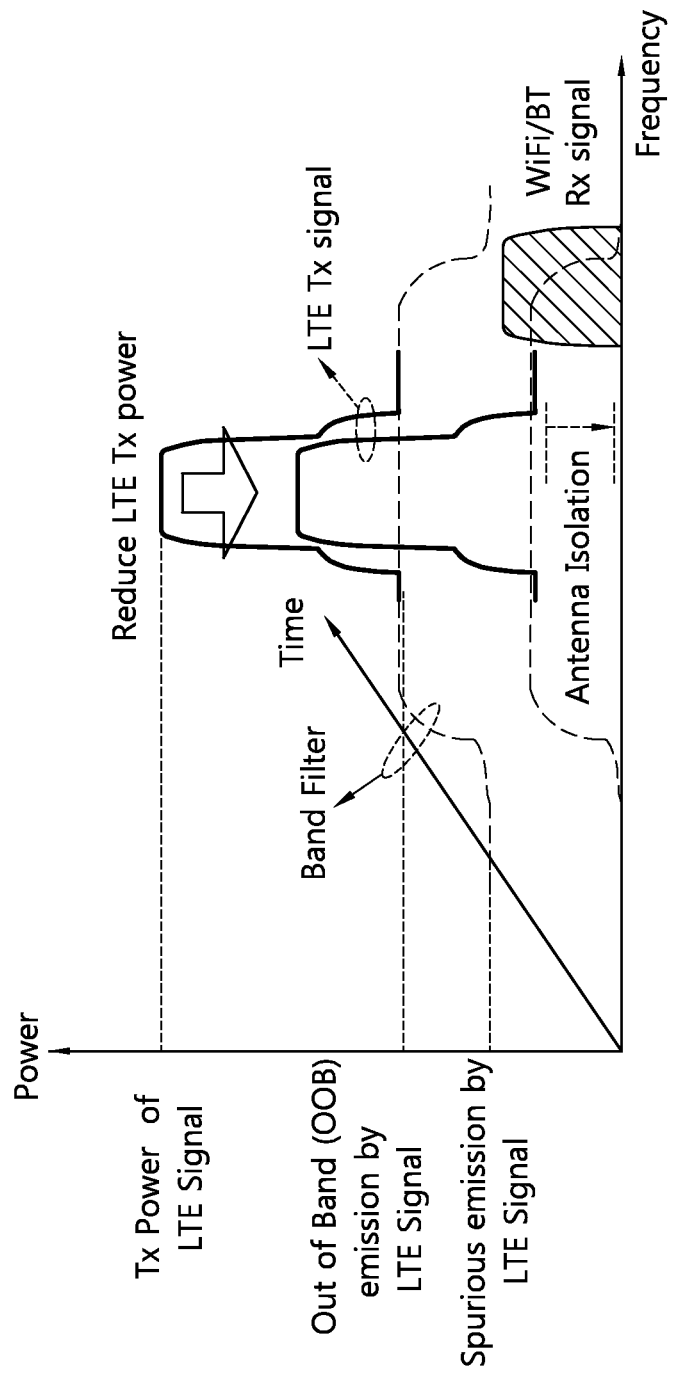
FIGS. 7 and 8 are explanatory diagrams illustrating one example of alleviating the in-device coexistence interference by using a power control scheme according to the present invention.
Figure 8:
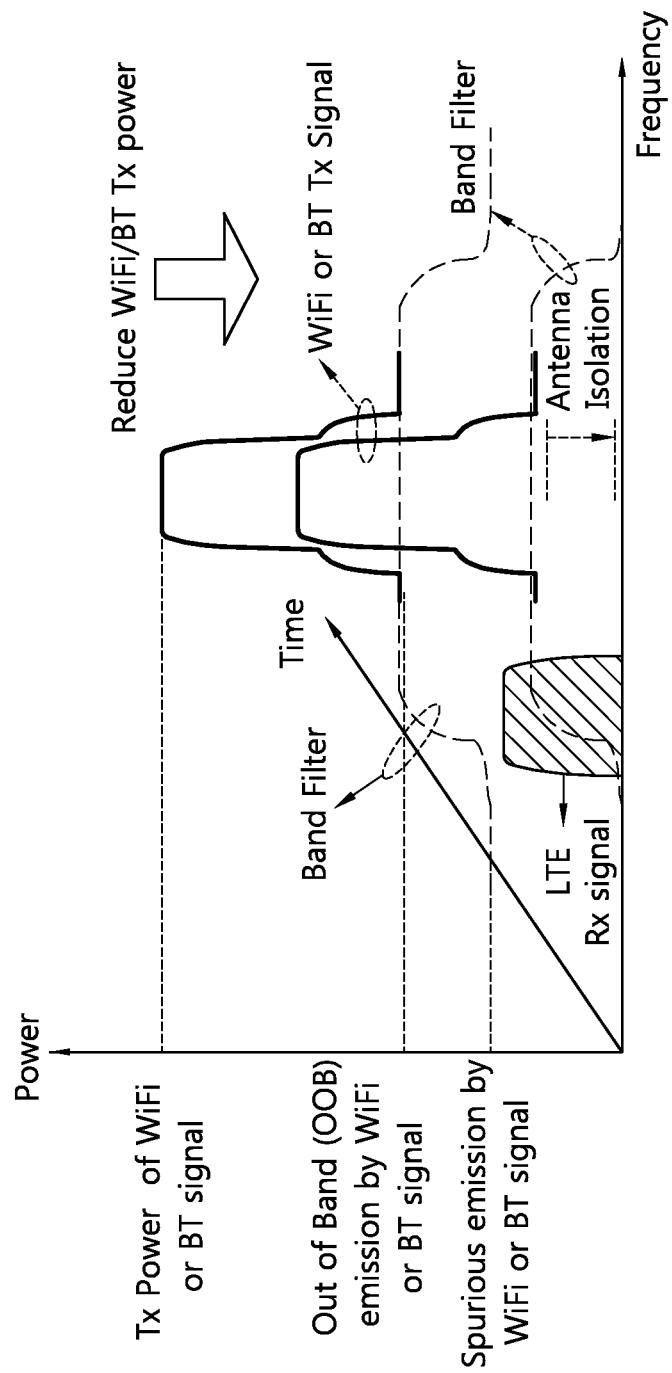

FIGS. 7 and 8 are explanatory diagrams illustrating one example of alleviating the in-device coexistence interference by using a power control (PC) scheme according to the present invention.

Referring to FIG. 7, the terminal avoids the in-device coexistence interference by lowering transmission power of the LTE signal by a predetermined level to improve reception quality of the ISM band and referring to FIG. 8, the terminal avoids the in-device coexistence interference by lowering transmission power of the ISM band by a predetermined level to improve reception quality of the LTE signal.

Figure 9:
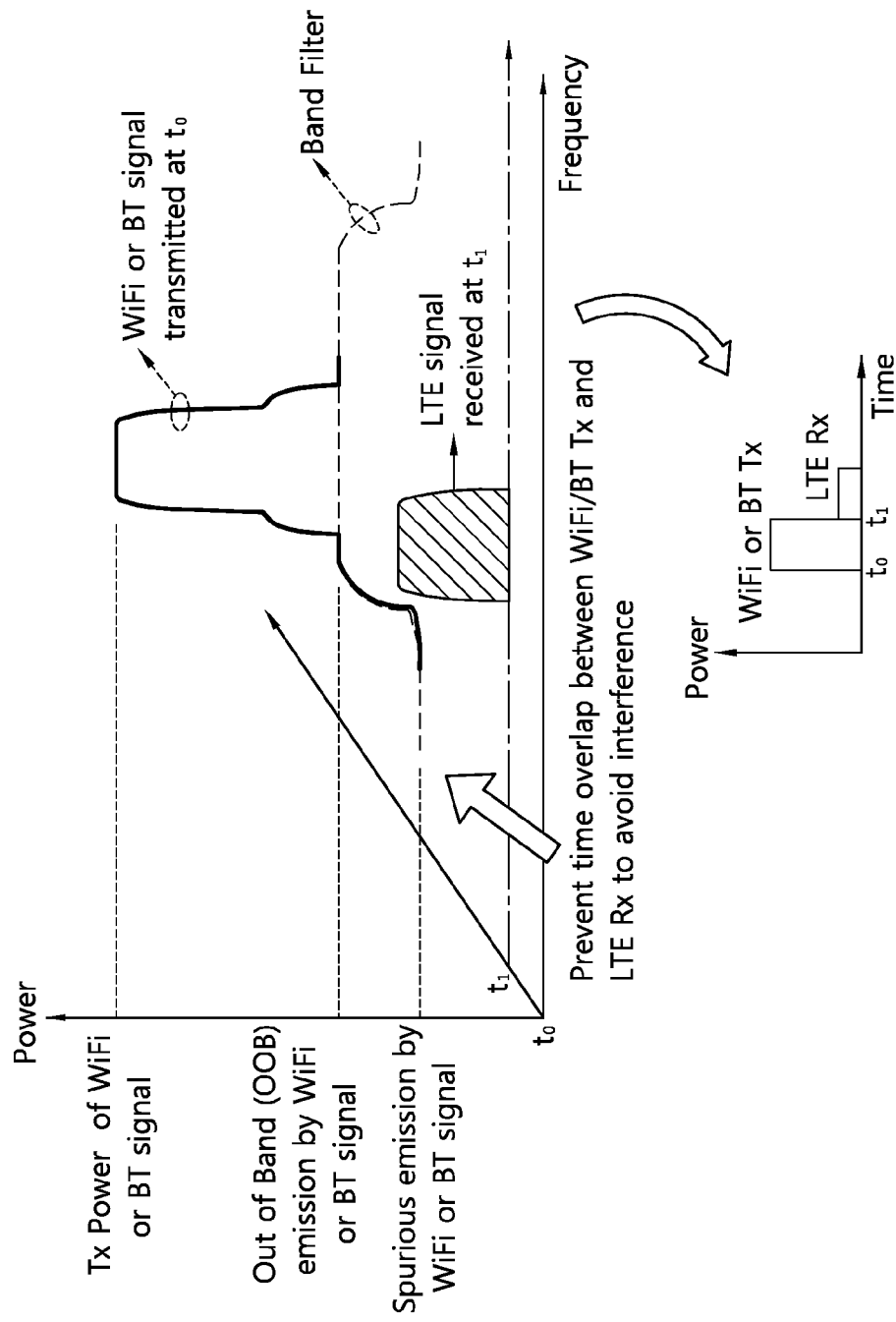
FIGS. 9 and 10 are explanatory diagrams illustrating one example of alleviating the in-device coexistence interference by using the time division multiplex scheme according to the present invention.

FIG. 9 is an explanatory diagram illustrating one example of alleviating the in-device coexistence interference by using the time division multiplex (TDM) scheme according to the present invention.

Referring to FIG. 9, when a reception time of the LTE signal is prevented from overlapping with a transmission time in the ISM band, the in-device coexistence interference may be avoided. For example, when the signal in the ISM band is transmitted at t0, the LTE signal is received at $t_1$.

Figure 10:
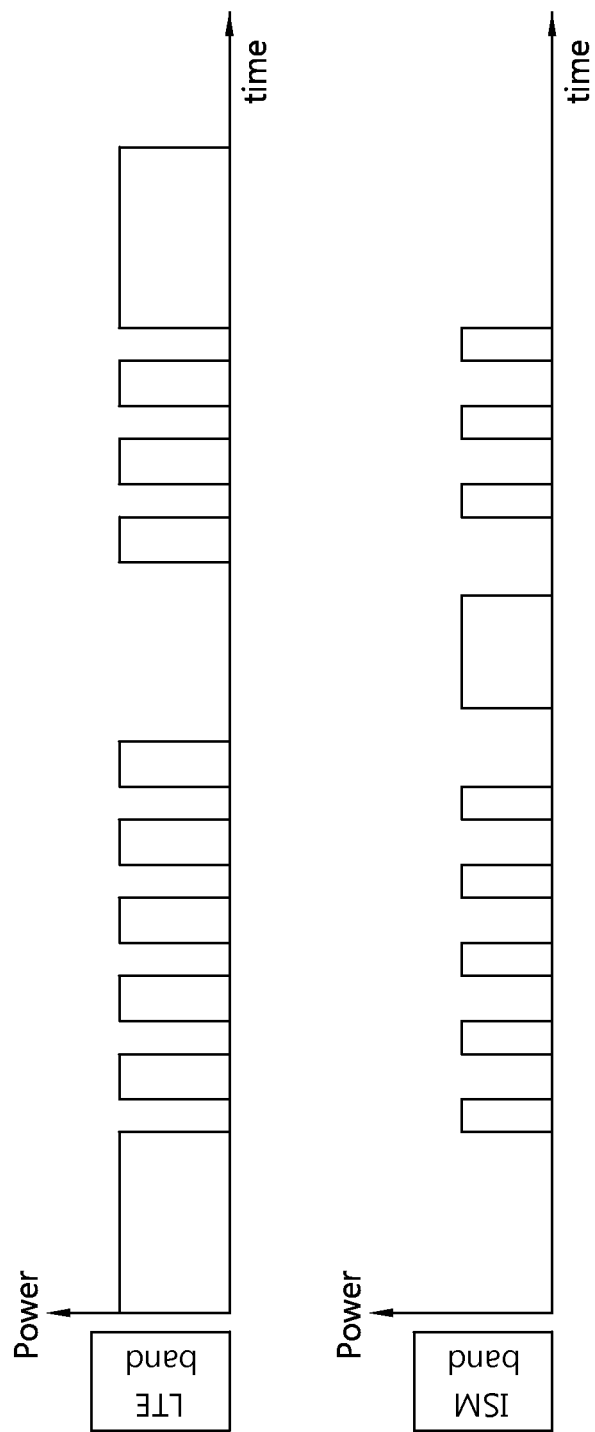

As such, according to the present invention, transmission/reception timings on time axes in the LTE band and the ISM band using the TDM scheme may be illustrated in FIG. 10.

Referring to FIG. 10, the in-device coexistence interference may be avoided without movement between the LTE band and the ISM band by the scheme of FIG. 9.

Figure 11:
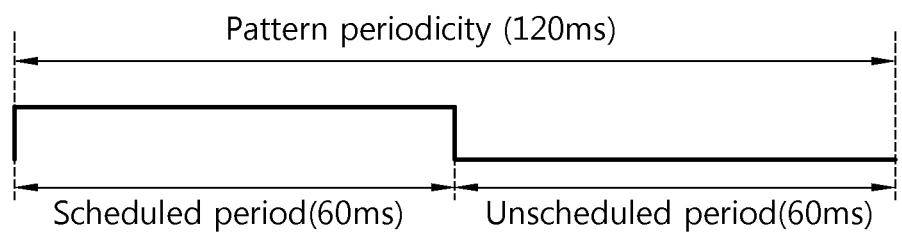
FIG. 11 is a diagram illustrating another example of alleviating the in-device coexistence interference by using the TDM scheme according to the present invention.

FIG. 11 is a diagram illustrating another example of alleviating the in-device coexistence interference by using the TDM scheme according to the present invention.

Referring to FIG. 11, a predetermined pattern periodicity interval is divided into a scheduled period interval and an unscheduled period interval to avoid the in-device coexistence interference by the TDM scheme based on discontinuous reception (DRX). Mutual interference between the LTE and the ISM is avoided by preventing the LTE from being transmitted within the unscheduled period interval. However, primary LTE transmission such as random access and hybrid automatic repeat request (HARQ) retransmission may be permitted even within the scheduled period interval. Mutual interference between the LTE and the ISM is avoided by preventing the ISM from being transmitted and permitting the LTE to be transmitted within the scheduled period interval. The primary ISM transmission such as Beacon or WiFi may be permitted even within the scheduled period interval, similarly as the unscheduled period interval. The LTE transmission may be prevented in order to protect the primary ISM transmission. Special signaling for protecting the primary ISM transmission such as Beacon may be added. As one example, a period of the Beacon signaling and information on a subframe offset may be added. In this case, the subframe offset number and the system frame number may be determined based on 0. The system frame number may have one of 0 to 1023 by the unit of a radio frame in the LTE system. One radio frame is constituted by ten subframes. When the corresponding subframe offset number and system frame number are known, an accurate frame position may be known in the corresponding system.

Figure 12:
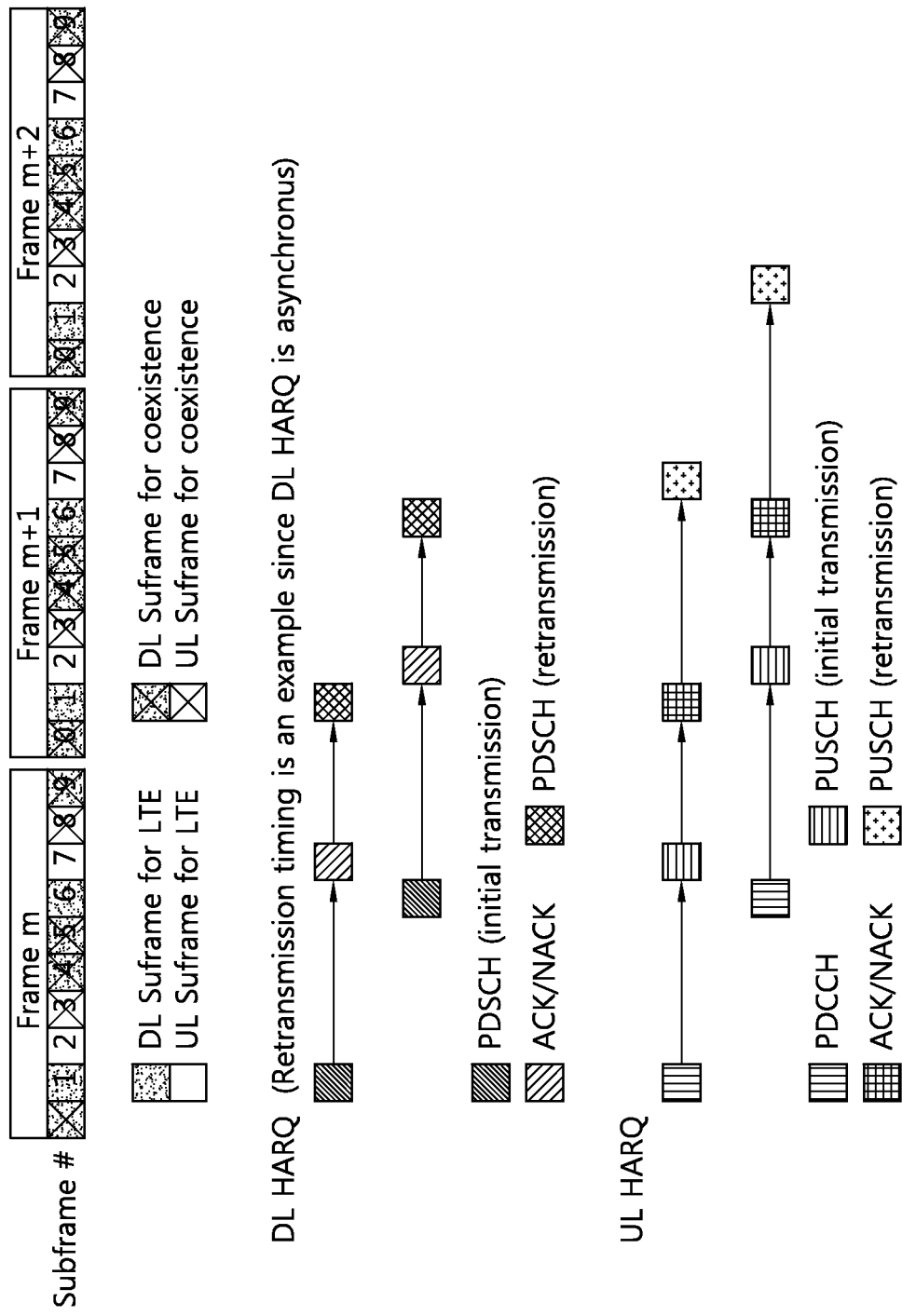
FIG. 12 is a diagram illustrating yet another example of alleviating the in-device coexistence interference by using the TDM scheme according to the present invention.

FIG. 12 is a diagram illustrating yet another example of alleviating the in-device coexistence interference by using the TDM scheme according to the present invention.

Referring to FIG. 12, by the TDM scheme based on the HARQ, a retransmission signal is preferably protected when data is transmitted based on the HARQ. Herein, being protected represents that retransmission is achieved without fail. If retransmission is not achieved in order to alleviate or avoid the in-device coexistence interference in the TDM scheme, the performance of the system will remarkably deteriorate. Based on this point, a transmission pattern is determined by considering a retransmission period. For DL transmission, subframes 1 and 6 are reserved in advance and for UL transmission, subframes 2 and 7 are reserved. These are called scheduled subframes. Unscheduled subframes for alleviating the in-device coexistence interference are not used in transmission in order to protect the ISM band.

Even in a scheme based on the HARQ similarly as a scheme based on DRX, the subframes reserved for transmission may be prevented from being transmitted in order to transmit a primary signal in the ISM. On the contrary, even in the unscheduled subframes, primary messages such as random access, system information, and a paging signal may be permitted to be transmitted.

The pattern may be given as a bitmap pattern. That is, the number of subframes indicated by one bit may be one or more. The period of the pattern is "the total length of the bitmap * the number of subframes per bit", and each bit may be "0" when a subframe directed by the bit is the scheduled subframe and each bit may be "1" when the corresponding subframe is the unscheduled subframe. On the contrary, when each subframe is the scheduled subframe, each bit may be "1" and when each subframe is the unscheduled subframe, each bit may be "0".

For example, it is assumed that the period is "20", a pattern expressing the subframe is "1001001000", the unscheduled subframe is "0", and the number of the subframes indicated by one bit is two. In the pattern representing the subframe, since first, fourth, and seventh bits are "1", subframes 0, 1, 6, 7, 12, and 13 are the scheduled subframes every period.

Figure 13:
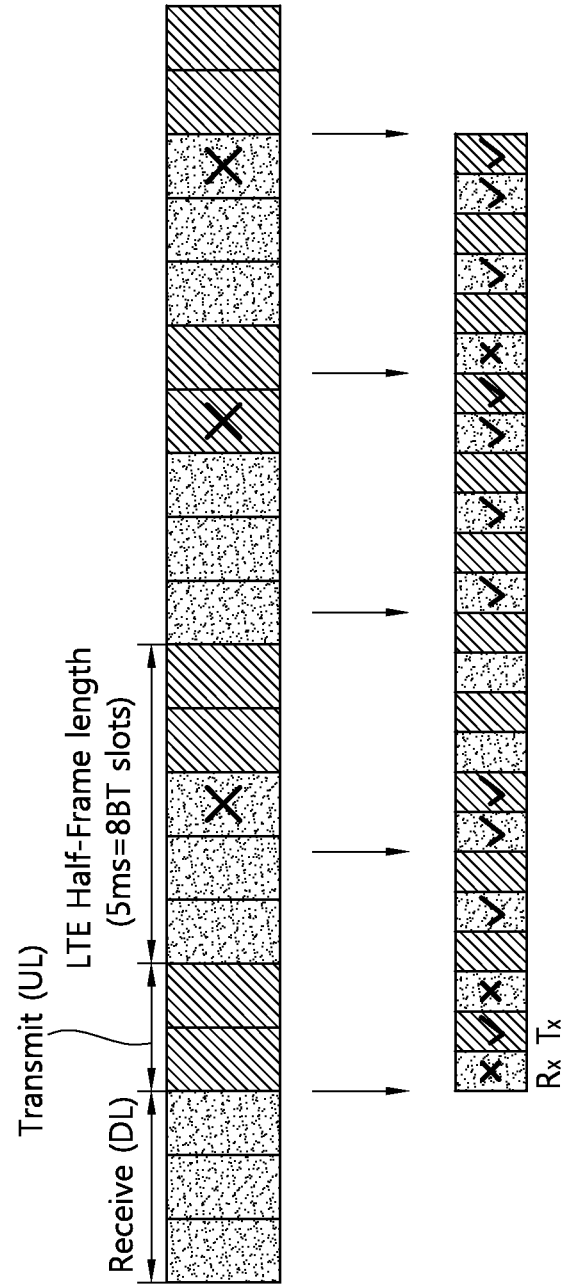
FIG. 13 is a diagram illustrating yet another example of alleviating the in-device coexistence interference according to the present invention.

FIG. 13 is a diagram illustrating yet another example of alleviating the in-device coexistence interference according to the present invention.

Referring to FIG. 13, by an autonomously denial scheme, when the in-device coexistence interference occurs in the terminal, transmission of the LTE is denied in order to protect the reception of the ISM. Herein, a ticked part means that transmission or reception is approved and a part marked by "X" means that transmission or reception is denied. Even though UL transmission is granted from the base station, the terminal denies granting not to perform UL transmission in order to protect the reception of the ISM. Similarly, transmission of the ISM is denied in order to protect the reception of the LTE.

Table 2 below shows a scenario (or information) regarding whether or not IDC interference is ongoing.

TABLE 2

| Scenario | Definition |
| --- | --- |
| 1 | IDC interference is ongoing at serving frequency band |
| 2 | Potential IDC interference exists at serving frequency band (but it is not currently ongoing) |
| 3 | IDC interference is ongoing at certain frequency band, rather than at serving frequency band |
| 4 | Potential IDC interference exists at certain frequency band, rather than serving frequency band (but IDC interference is not currently ongoing) |

The respective scenarios indicate an interference state based on an interference type and a frequency band. Since an unusable frequency band is unrelated to whether or not it is a serving frequency band, all of the scenario 1 to scenario 3 may be considered to have ongoing IDC interference.

Figure 14:
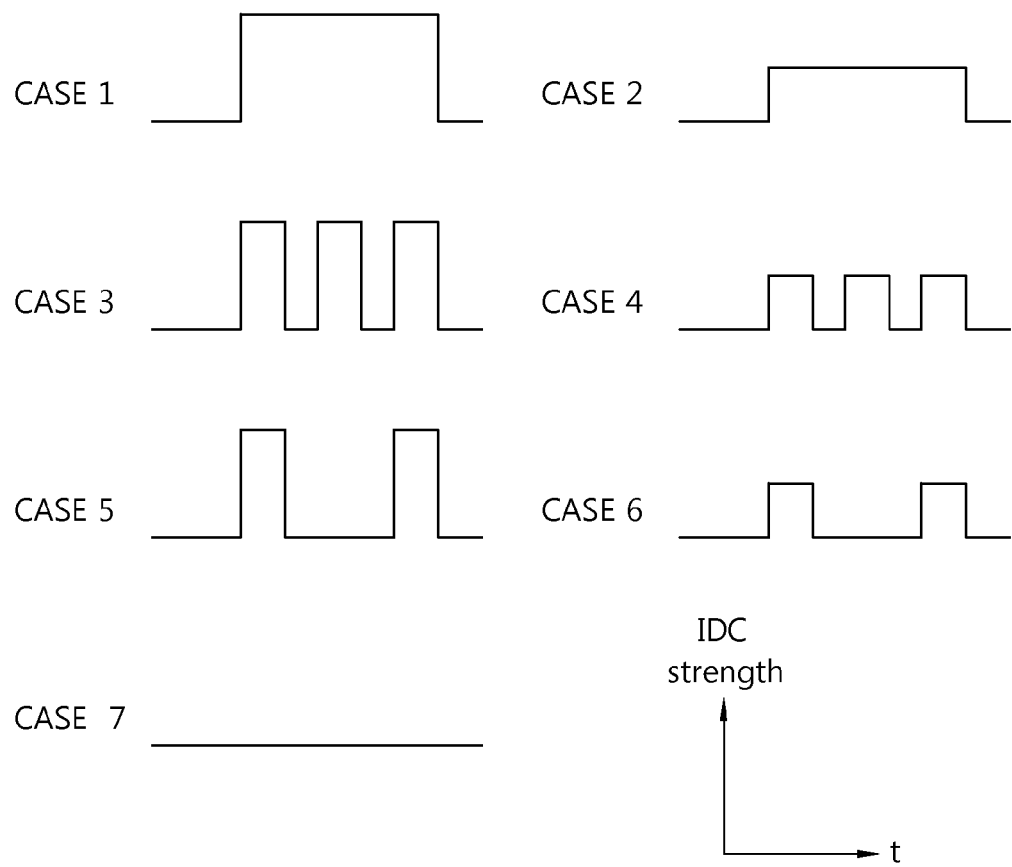
FIG. 14 illustrates cases that the UE receives an interference signal therein.

FIG. 14 illustrates cases that the UE receives an interference signal therein.

Referring to FIG. 14, receiving of an interference signal may be classified into seven cases based on interference oftenness and strength of power.

When the seven cases are classified into four patterns based on the oftenness of interference, case 1 and case 2 may be classified to have a continuous interference pattern, case 3 and case 4 may be classified to have bursty interference pattern, case 5 and case 6 may be classified into a sparse interference pattern, and case 7 may be classified into a none interference pattern.

When the seven cases are classified into three patterns based on strength of interference, case 1, case 3, and case 5 may be classified into a too strong interference pattern, case 2, case 4, and case 5 may be classified into an enough weak interference pattern, and case 7 may be classified into a none interference pattern.

Here, in an embodiment of the present invention, it is determined that IDC interference is ongoing in the UE, in the case corresponds to case 1 and case 3. Namely, the case corresponds to the case that interference is at least continuous or bursty and has very strong strength.

Meanwhile, a state in which coexistence interference occurs, although not an unusable frequency, having a possibility of being changed into a state in which IDC interference is ongoing, is called a "presence of potential IDC interference".

For example, case 2, case 4, case 5, and case 6 may be determined to correspond to "presence of potential IDC interference". In another example, only case 5 having very strong strength may be determined to correspond to "presence of potential IDC interference".

A method of controlling IDC interference according to the present invention is described below. An operation of reducing, avoiding, or removing interference is hereinafter commonly called interference control or interference coordination.

Figure 15:
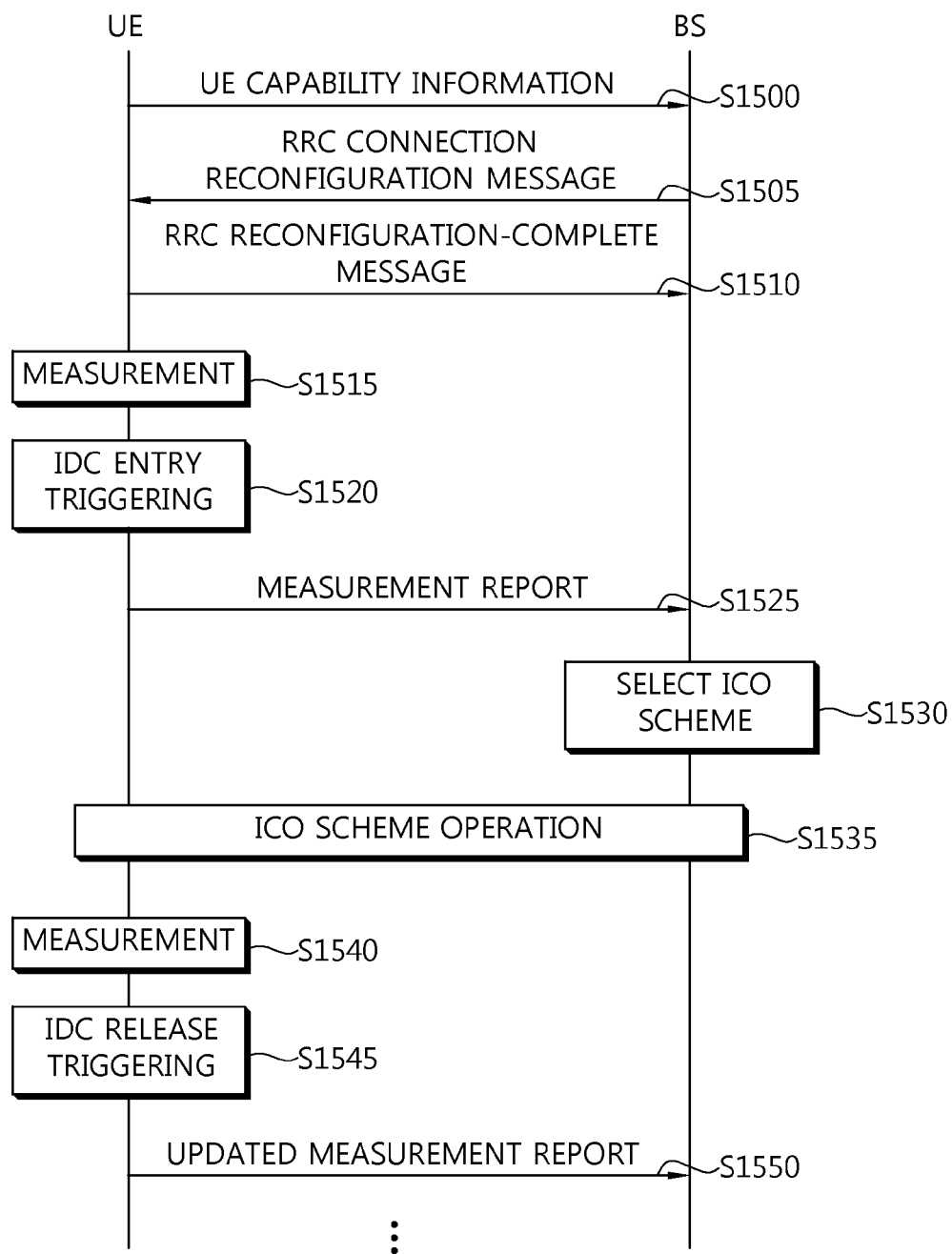
FIG. 15 is a flowchart illustrating an example of an operation of UE and a BS performing In-device Coexistence interference coOrdination (ICO).

FIG. 15 is a flowchart illustrating an example of an operation of UE and a BS performing In-device Coexistence interference coOrdination (ICO).

Referring to FIG. 15, the UE transmits UE capability information to the BS as step S1500. The UE capability information may include information on an IDC existence possibility. The UE capability information may further include information on a possible frequency band with an IDC existence possibility. In some embodiments, the UE capability information may include information on a frequency band without an IDC existence possibility. The UE capability information may also include information on a frequency band with potential IDC interference.

The frequency band including an IDC existence possibility may be referred to as a frequency band having a possibility of an unusable frequency. The unusable frequency refers to a state in which communication in a corresponding frequency is not smooth because there is on-going IDC interference in the corresponding frequency. For example, although WiFi is not turned on and thus there is no coexistence interference when UE performs initial LTE access, the UE determines that a frequency band 40 is a frequency band having an IDC coexistence possibility because it includes WiFi and determines that the frequency band 40 may be an unusable frequency due to on-going IDC interference at the frequency band 40.

The UE capability information may further include information on the ISM performance of UE. UE can adjust a maximum transmission value of LTE uplink transmission power and reduce interference with an ISM band based on the information on the ISM performance of the UE.

The UE capability information may also include ICO support indication indicating whether UE has an ICO capability for controlling IDC interference. If the ICO support indication indicates that UE does not have an ICO capability for controlling IDC interference, a BS does not need to transmit information related to ICO to the UE. The ICO support indication may be a bitmap indicator. For example, when the bitmap indicator is 0, it indicates that there is no capability of controlling IDC interference. When the bitmap indicator is 1, it indicates that there is a capability of controlling IDC interference.

Meanwhile, the UE capability information may be included in a UE capability information message and transmitted. A detailed message structure on which the UE capability information is transmitted is described below. A UE capability information message may include a physical layer parameter information entity or a measurement parameter information entity, and the physical layer parameter information entity may include ICO support indication. The ICO support indication indicates whether UE supports an operation of controlling IDC interference or not. Furthermore, the measurement parameter information entity may include information on a frequency band having a possibility of ongoing IDC interference in a list form. The information on a frequency band may include information on not only a frequency band with an IDC coexistence possibility, but also a potential IDC interference frequency band.

After the step S1500, the BS transmits an RRC connection reconfiguration message to the UE as step S1505.

The RRC connection reconfiguration message includes measurement configuration information on which measurement to be performed by the UE is configured.

The RRC connection reconfiguration message further includes a threshold on which UE uses an event indicating that an on-going IDC interference state has been started or ended as a triggering condition (hereinafter referred to as an "IDC triggering threshold"). The IDC triggering threshold may be an IDC triggering entry threshold or an IDC triggering release threshold. The IDC triggering entry threshold and the IDC triggering release threshold may have the same value. Furthermore, the IDC triggering threshold may be a value related to the measurement value of LTE downlink and may be used as a triggering condition for an interference direction from ISM to LTE.

The RRC connection reconfiguration message may further include report IDC quantity. The existing report quantity is information for a measurement report configuration and is information on whether UE uses an RSRP value or an RSRQ value or the UE uses both the RSRP value and the RSRQ value when performing measurement.

Report IDC quantity according to the present invention is a new type of report quantity in which information measured by UE and reported from the UE to a BS is configured so that it includes a measurement result related to IDC interference due to IDC interference-related triggering. More particularly, the report IDC quantity may indicate that measurement report information reported from UE to a BS includes a TDM pattern, an unusable frequency band, or an additional measurement result (e.g., an additional report on measurement with IDC interference). The report IDC quantity may be a bitmap indicator. The report IDC quantity may be included in the report configuration information entity of an RRC connection reconfiguration message.

After the step S1505, the UE transmits an RRC reconfiguration-complete message to the BS as step S1510. The RRC reconfiguration-complete message may include acknowledgement for the reception of the RRC connection reconfiguration message.

Furthermore, the UE performs measurement according to a rule (also called "UE-internal coordination") for obtaining measurement samples as step S1515.

For example, the UE performs measurement considering IDC interference and measurement not considering IDC interference. The UE performs measurement using a measurement sample at a part including IDC influence and a measurement sample at a part excluding IDC influence.

Figure 16:
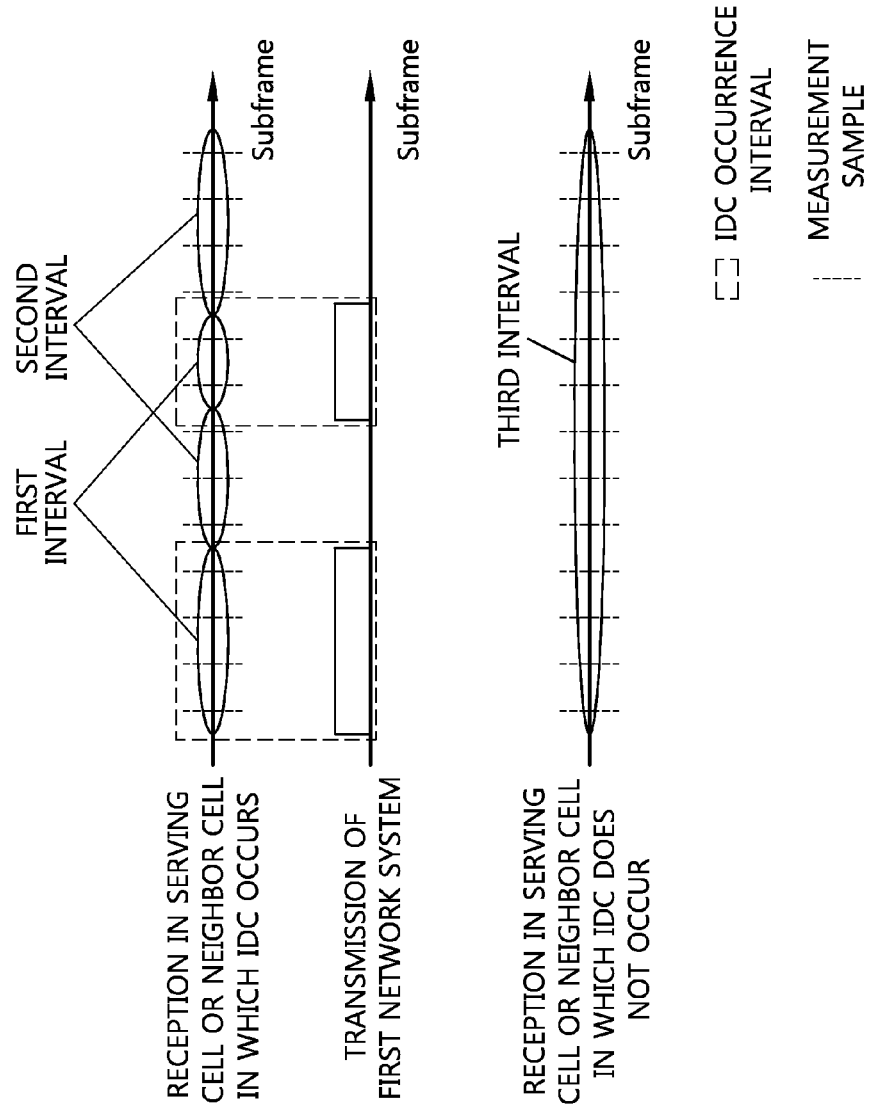
FIG. 16 is a diagram illustrating an example in which UE performs measurement considering IDC interference and measurement not considering IDC interference in accordance with the present invention.

FIG. 16 is a diagram illustrating an example in which UE performs measurement considering IDC interference and measurement not considering IDC interference in accordance with the present invention.

Referring to FIG. 16, the UE calculates measurement samples including IDC influence in a interval in which IDC interference is generated in a serving cell or a neighbor cell (i.e., a first interval) and calculates measurement samples excluding IDC influence in a interval in which IDC interference is not generated (i.e., a second interval). Here, the neighbor cell means a cell that has been configured through an RRC connection reconfiguration process and is used as a comparison group of a measurement report event. The UE calculates measurement samples in the entire interval (i.e., a third interval) irrespective of IDC interference in a serving cell or a neighbor cell in which IDC interference is not generated. Here, the UE may calculate measurement samples in each subframe, some subframes, or specific subframes within each interval.

In the first interval, a measurement sample including IDC influence is a measurement sample including the influence of integration interference. Here, the integration interference refers to the sum of IDC interference, inter-cell interference (e.g., the interference of co-channel serving and non-serving cells and the interference of adjacent channels), and thermal noise. In contrast, in the second interval, a measurement sample excluding IDC influence refers to a measurement sample including only the influence of inter-cell interference or thermal noise.

A first network system refers to a network system that provides the influence of influence when IDC interference occurs, and a second network system refers to a network system that is attached by interference. For example, when an ISM receiving stage is influenced by interference in LTE uplink, the ISM receiving stage is the second network system. In contrast, when the receiving stage of LTE downlink is influenced by interference due to an ISM transmitting stage, the LTE system is the second network system.

A measurement sample excluding IDC influence in a neighbor cell that is calculated based on RSRQ is conceptually expressed by Equation 1 below.

$$MeasurementSample = \frac{S}{I+N} \quad \text{[Equation 1]}$$

In Equation 1, S is the intensity of a reception signal through the neighbor cell in the second network system, I is the intensity of an interference signal (e.g., inter-cell interference) that affects the second network system, and N is the intensity of noise (e.g., thermal noise). That is, the measurement sample means a ratio of the reception signal to interference and noise.

A measurement sample excluding IDC influence in a neighbor cell that is calculated based on RSRP is conceptually expressed by Equation 2 below.

$$MeasurementSample = S \quad \text{[Equation 2]}$$

In Equation 2, S refers to the intensity of a reception signal through the neighbor cell in the second network system. That is, the measurement sample refers to the intensity of the reception signal in the neighbor cell in the second network system.

A measurement sample including IDC influence in a serving cell that is calculated based on RSRQ is conceptually expressed by Equation 3 below.

$$MeasurementSample = \frac{S}{I+N+I'} \quad \text{[Equation 3]}$$

In Equation 3, S is the intensity of a reception signal through the serving cell in the second network system, I is the intensity of an interference signal (e.g., inter-cell interference) that affects the second network system, N is the intensity of noise (e.g., thermal noise), and I' is the intensity of IDC interference. That is, the measurement sample means a ratio of the reception signal to integration interference (i.e., the sum of IDC interference, inter-cell interference, and thermal noise).

A measurement sample including IDC influence in a serving cell that is calculated based on RSRP is conceptually expressed by Equation 4 below.

$$MeasurementSample = I'_sS + I'_cS \quad \text{[Equation 4]}$$

In Equation 4, I' is the intensity of IDC interference, and the measurement sample means the intensity of an IDC interference signal in the serving cell, and S is the intensity of a reception signal in the second network system. If it is sought to measure only IDC influence, I' may become a result value. If it is sought to measure a value including IDC interference, S+I' may become a result value. If it is sought to measure a value from which IDC interference has been removed, S may become a result value.

Meanwhile, the number of an entity (e.g., UE) that performs the measurement may be one or plural. For example, an entity that performs measurement considering IDC interference and an entity that performs measurement not considering IDC interference may exist independently.

A measurement result considering IDC interference and a measurement result not considering IDC interference are defined below. In general, the term 'measurement result' means a value that has been finally calculated by filtering measurement samples. For example, in the case of LTE, the final RSRP and RSRQ values generated by L1 filtering and L3 filtering are measurement results that are reported to a BS. Here, the measurement result considering IDC interference may be a result obtained by filtering only measurement samples including IDC interference or a result obtained by filtering both measurement samples including IDC interference and measurement samples excluding IDC interference. Furthermore, the measurement result not considering IDC interference may be a result obtained by filtering only measurement samples excluding IDC interference or a result obtained by filtering measurement samples obtained by removing IDC interference from measurement samples excluding IDC interference and measurement samples including IDC interference according to an interference removal scheme.

After the step S1515, the UE triggers an event, indicating that an on-going IDC interference state has been started for a usable frequency band, based on an IDC triggering threshold (hereinafter referred to as "IDC entry triggering") as step S1520.

For example, the UE compares a measurement result considering IDC interference in a serving cell (i.e., a primary serving cell or a secondary serving cell) in which IDC interference occurs with a measurement result not considering IDC interference in a neighbor cell configured through an RRC connection reconfiguration process. If a difference between the measurement result considering IDC interference in the serving cell and the measurement result not considering IDC interference in the neighbor cell is an IDC triggering threshold or higher, the UE performs IDC entry triggering.

For another example, the UE compares a measurement result not considering IDC interference in a serving cell (i.e., a primary serving cell or a secondary serving cell) in which IDC interference has not occurred with a measurement result considering IDC interference in a neighbor cell configured through an RRC connection reconfiguration process. If a difference between the measurement result not considering IDC interference in the serving cell and the measurement result considering IDC interference in the neighbor cell is an IDC triggering threshold (i.e., an entry threshold) or higher, the UE performs IDC entry triggering.

The IDC triggering threshold may be a threshold that is used in a measurement configuration and may be, in particular, a threshold related to inter-frequency measurement. That is, event trigging thresholds used for mobility irrespective of IDC interference may be reused as IDC triggering thresholds.

As an example according to the present invention, if a serving cell in which IDC interference occurs is a primary serving cell, a triggering-related threshold of an A3 event may be used as an IDC triggering threshold. Here, the A3 event is an event that is triggered when the measurement result of a neighbor cell is greater than the measurement result of a primary serving cell by an offset. That is, in the case where handover or cell reselection is necessary because to provide service through a neighbor cell is more appropriate, when the A3 event is triggered, UE performs a handover or cell reselection procedure. Here, the serving cell triggers the A3 event in a frequency band different from the frequency band of a primary serving cell that is indicated in a corresponding measurement object.

A condition that UE triggers the entry of the A3 event is expressed in Equation 5 below, a condition that UE triggers the release of the A3 event is expressed in Equation 6 below.

$$M_n + O_{fn} + O_{cn} - Hys > M_p + O_{fp} + O_{cp} + \text{Off} \quad \text{[Equation 5]}$$

$$M_n + O_{fn} + O_{cn} + Hys \leq M_p + O_{fp} + O_{cp} + \text{Off} \quad \text{[Equation 6]}$$

In Equations 5 and 6, $M_n$ is the measurement result of a neighbor cell excluding an offset, and $O_{fn}$ is the frequency-specific offset of the neighbor cell (e.g., an offset value defined in measurement object EUTRA related to the frequency of the neighbor cell). $O_{cn}$ is the cell-specific offset of the neighbor cell (e.g., an offset value for each cell that is defined in measurement object EUTRA related to the frequency of the neighbor cell). $O_{cn}$ is 0 if it is not set in the neighbor cell. $M_p$ is the measurement result of a primary serving cell excluding an offset, and $O_{fp}$ is the primary frequency-specific offset of a primary serving cell (e.g., an offset value that is defined in measurement object EUTRA related to the frequency of the primary serving cell). $O_{cp}$ is the cell-specific offset of a primary serving cell (e.g., an offset for each cell that is defined in measurement object EUTRA related to the frequency of the primary serving cell. $O_{cp}$ is 0 if it is not set in the primary serving cell. Hys is a hysteresis parameter for the A3 event. For example, Hys is a hysteresis value defined in report configuration EUTRA. Off is an offset parameter for the A3 event. For example, Off is "a3-Offset" defined in report configuration EUTRA. $M_n$ and $M_p$ are represented in dBm in the case of Reference Signal Received Power (RSRP) and are represented in dB in the case of Reference Signal Received Quality (RSRQ). $O_{fn}$, $O_{cn}$, $O_{fp}$, $O_{cp}$, Hys, and Off are represented in dB.

In accordance with the present invention, an IDC triggering entry threshold may be configured using offset values (e.g., $O_{fn}$, $O_{cn}$, $O_{fp}$, $O_{cp}$, and Off) that trigger the A3 event. For example, an IDC triggering entry threshold may be configured like "$O_{fp} + O_{cp} + \text{Off} - O_{fn} - O_{cn}$". Equation 7 below shows an IDC entry triggering condition using an A3 event trigging threshold.

$$M_n - M_p > Th_{entry} \quad \text{[Equation 7]}$$

In Equation 7, $M_n$ is a measurement result not considering IDC interference in a neighbor cell, $M_p$ is a measurement result considering IDC interference in a primary serving cell, and $Th_{entry}$ is an IDC triggering entry threshold.

Referring to Equation 7, UE performs IDC entry triggering in a corresponding frequency band if a difference between the measurement result not considering IDC interference $M_n$ in a neighbor cell and the measurement result considering IDC interference $M_p$ in a primary serving cell is greater than the IDC triggering entry threshold $Th_{entry}$.

For example, a hysteresis margin may be added to the IDC entry triggering condition. The hysteresis margin refers to a value that triggers a corresponding event only there is a change of a hysteresis margin greater than a specific threshold in triggering the entry or release of a specific event. Equation 8 below indicates an IDC entry triggering condition in which the hysteresis margin is taken into consideration.

$$M_n - M_p - Hys > Th_{entry} \quad \text{[Equation 8]}$$

In Equation 8, $M_n$ is a measurement result not considering IDC interference in a is neighbor cell, $M_p$ is a measurement result considering IDC interference in a primary serving cell, $Th_{entry}$ is an IDC triggering entry threshold, and Hys is a hysteresis margin.

Referring to Equation 8, UE performs IDC entry triggering if a difference between the measurement result not considering IDC interference $M_n$ in a neighbor cell and the measurement result considering IDC interference $M_p$ in a primary serving cell is greater than the IDC triggering entry threshold by the hysteresis margin Hys.

In another embodiment of the present invention, if a serving cell in which IDC interference occurs is a secondary serving cell, a threshold related to the triggering of an A6 event may be used as an IDC triggering threshold. Here, the A6 event is an event that is triggered when the measurement result of a neighbor cell is greater than the measurement result of a secondary serving cell by an offset or higher. When the A6 event is triggered, UE performs a handover or cell reselection procedure. Here, the neighbor cell provides service in the same frequency band as the secondary serving cell, and the frequency band is a frequency band indicated in a corresponding measurement object.

A condition that UE triggers the entry of the A6 event is expressed in Equation 9 below, and a condition that UE releases the A6 event is expressed in Equation 10 below. For measurement, a serving cell is assumed to be a secondary serving cell configured in a frequency band indicated in corresponding measurement object EUTRA.

$$M_n + O_{cn} - Hys > M_s + O_{cs} + \text{Off} \quad \text{[Equation 9]}$$

$$M_n + O_{cn} + Hys < M_s + O_{cs} + \text{Off} \quad \text{[Equation 10]}$$

In Equations 10 and 11, $M_n$ is the measurement result of a neighbor cell is excluding an offset. $O_{cn}$ is the cell-specific offset of a neighbor cell (e.g., an offset for each cell that is defined in measurement object EUTRA related to the frequency of the neighbor cell). $O_{cn}$ is 0 if it is not set in the neighbor cell. $M_s$ is the measurement result of a secondary serving cell excluding an offset. $O_{cs}$ is the cell-specific offset of the secondary serving cell (e.g., an offset for each cell that is defined in measurement object EUTRA related to a serving frequency). $O_{cs}$ is 0 if it is not set in the secondary serving cell. Hys is a hysteresis parameter for the A6 event. For example, Hys is a hysteresis value defined in report configuration EUTRA. Off is an offset parameter for the A6 event. For example, Off is "a6-Offset" defined in report configuration EUTRA. $M_n$ and $M_s$ are represented in dBm in the case of RSRP and are represented in dB in the case of RSRQ. $O_{cn}$, $O_{cs}$, Hys, and Off are represented in dB.

In accordance with the present invention, an IDC triggering entry threshold may be configured using offset values (e.g., $O_{cn}$, $O_{cs}$, and Off) that trigger the A6 event. For example, the IDC triggering entry threshold may be configured like "$O_{cs}$+ Off$-O_{cn}$". Equation 11 below shows an IDC entry triggering condition using an A6 event trigging threshold.

$$M_n - M_s > Th_{entry} \quad \text{[Equation 11]}$$

In Equation 11, $M_n$ is a measurement result not considering IDC interference in a neighbor cell, $M_s$ is a measurement result considering IDC interference in a secondary serving cell, and $Th_{entry}$ is an IDC triggering entry threshold.

Referring to Equation 11, UE performs IDC entry triggering in a corresponding frequency band if a difference between the measurement result not considering IDC interference $M_n$ in a neighbor cell and the measurement result considering IDC interference $M_s$ in a secondary serving cell is greater than the IDC triggering entry threshold $Th_{entry}$.

For example, a hysteresis margin may be added to the IDC entry triggering condition. Equation 12 below shows an IDC entry triggering condition in which the hysteresis margin is taken into consideration.

$$M_n - M_s - Hys > Th_{entry} \quad \text{[Equation 12]}$$

In Equation 12, $M_n$ is a measurement result not considering IDC interference in a neighbor cell, $M_s$ is a measurement result considering IDC interference in a secondary serving cell, $Th_{entry}$ is an IDC triggering entry threshold, and Hys is a hysteresis margin.

Referring to Equation 12, UE performs IDC entry triggering if a difference between the measurement result not considering IDC interference $M_n$ in a neighbor cell and the measurement result considering IDC interference $M_s$ in a secondary serving cell is greater than an IDC triggering entry threshold by a hysteresis margin Hys or higher.

In another embodiment of the present invention, UE may determine triggering based on only a measurement result considering IDC interference in a serving cell (i.e., a primary serving cell or a secondary serving cell) and perform IDC entry triggering if the measurement result considering IDC interference is smaller than an IDC triggering threshold based on a result of the determination.

As another example according to the present invention, UE performs triggering based on only a measurement result not considering IDC interference in a neighbor cell and performs IDC entry triggering based on a result of the determination. Here, the triggering may be triggering for mobility.

After the step S1520, the UE that has performed the measurement reports measurement report information, including a measurement result and IDC interference indication, to the BS as step S1525. The IDC interference indication may indicate that IDC interference is on going in a specific frequency band of UE and may indicate that IDC entry triggering is performed. The measurement report information may be included in a measurement report message.

The measurement report information may further include information on a Time Division Multiplexing (TDM) pattern that is available in a corresponding frequency band.

The measurement report information may further include information on unusable frequency bands. In accordance with the present invention, the unusable frequency band may be defined in two types.

For example, a frequency band in which communication is not smooth because IDC interference is on going in UE may be defined as an unusable frequency (i.e., a first type). That is, if interference of a specific level or higher is generated based on only IDC interference without taking the influence of interferences, such as inter-cell interference and thermal noise, into consideration, a corresponding frequency band may be defined as an unusable frequency. A reference value for interference used to determine a frequency band in which communication is not smooth may be determined on the basis of a threshold used in IDC entry triggering, a new value that is signalized by a BS, or a specific value determined within UE. A BS may signalize the reference value for interference through an RRC connection reconfiguration or a system information message.

For another example, if the intensity of integration interference is large enough to perform IDC entry triggering although it is not an on-going IDC interference state, a is corresponding frequency band may be defined as an unusable frequency (i.e., a second type). That is, a corresponding frequency band may be defined as an unusable frequency on the basis of integration interference including not only IDC interference, but also inter-cell interference and thermal noise. That is, if communication is not smooth due to great inter-cell interference or thermal noise although IDC interference is not great, a corresponding frequency may be defined as an unusable frequency. In contrast, if inter-cell interference or thermal noise is not great, but IDC interference is great, a corresponding frequency band may be defined as an unusable frequency.

For example, when a threshold on which IDC entry triggering is performed is "−3 dB", it is assumed that the intensity of integration interference is "−3 dB", the intensity of IDC interference is "−1 dB", and other interferences are "−2 dB" in relation to a specific frequency band. The specific frequency band does not correspond to the unusable frequency band of the first type, but corresponds to the unusable frequency band of the second type.

For another example, when a threshold on which IDC entry triggering is performed is "−3 dB", it is assumed that the intensity of IDC interference is "−3 dB" in relation to a specific frequency band. The specific frequency band corresponds to both the unusable frequency band of the first type and the unusable frequency band of the second type.

Information on an unusable frequency band may include information on the range of a frequency band. In some embodiments, the information on an unusable frequency band may include frequency band indication used in an LTE band. In some embodiments, the information on an unusable frequency band may include an E-UTRA Absolute Radio Frequency Channel Number (EARFCN) used in an LTE band. In some embodiments, the information on an unusable frequency band may include a cell index. The frequency of a cell indicated by the cell index indicates an unusable frequency band.

Meanwhile, the measurement report information may include information on the type of unusable frequency band (i.e., information on whether an unusable frequency band is the first type or the second type) along with the information on an unusable frequency band.

Furthermore, the measurement report information may be included in a measurement result information entity within a measurement report message.

The measurement report information may include only a measurement result for a part without IDC influence. In some embodiments, the measurement report information may include both a measurement result for a part without IDC influence and a measurement result for a part with IDC influence. In some embodiments, the measurement report information may include a measurement result for a part without IDC influence and a difference between the measurement result for a part without IDC influence and a measurement result for a part with IDC influence.

After the step S1525, the BS selects the most appropriate In-device Coexistence interference coOrdination (ICO) scheme based on the measurement report information as step S1530 The BS transfers the selected ICO scheme to the UE, and the control operation is performed between the BS and the UE as step S1535. Here, the ICO scheme may be an FDM operation or a TDM operation. The FDM operation may be performed through an RRC connection reconfiguration. The TDM operation may be performed through the indication of a TDM pattern or a discontinuous reception (DRX) reconfiguration. Furthermore, the FDM operation or the TDM operation may be an operation according to FIGS. 5 to 13.

For example, when there is a problem in a frequency band on which a BS provides service, if it is determined that there is no problem in a usable frequency due to load balancing and there is no significant influence in handover (e.g., when the RSRP or RSRQ value of a corresponding frequency band is very large) according to the measurement result (or the measurement report information), the FDM operation is performed. If not, the TDM operation may be performed in a serving cell.

The UE that has performed the operation of controlling IDC interference with the BS performs measurement considering IDC interference in a serving cell or a neighbor cell in which IDC interference is generated and measurement not considering IDC interference in a serving cell or a neighbor cell in which IDC interference is not generated as step S1540. The UE performs the measurement using measurement samples at a part including IDC influence in the corresponding cell and measurement samples at a port not including IDC influence. The UE calculates a measurement result considering IDC interference and a measurement result not considering IDC interference for the serving cell and the neighbor cell based on the corresponding measurement samples. The UE calculates measurement samples and a corresponding measurement result based on the third interval in the serving cell or the neighbor cell not including IDC interference.

Next, the UE triggers an event, indicating that the on-going IDC interference state for the unusable frequency band has been terminated based on the measurement results and the IDC triggering threshold (i.e., a release threshold) (hereinafter referred to as "IDC release triggering") as step S1545. Here, the termination of the on-going IDC interference state means that there is no difficulty in performing communication because IDC interference is very small or generated very little in the corresponding frequency band.

For example, if a difference between a measurement result considering IDC interference in a serving cell (i.e., a primary serving cell or a secondary serving cell) and a measurement result not considering IDC interference in a neighbor cell configured through an RRC connection reconfiguration process in an on-going IDC interference state is less than an IDC triggering threshold (i.e., a release threshold), the UE performs IDC release triggering.

If a serving cell in which IDC interference is generated is a primary serving cell, an A3 event trigging threshold may be used as the IDC triggering threshold. A condition that the release of the A3 event is triggered (i.e., Equation 6) is used.

In accordance with the present invention, an IDC triggering release threshold may be configured using offset values (i.e., $O_{fn}$, $O_{cn}$, $O_{fp}$, $O_{cp}$, and Off) that trigger the A3 event. For example, an IDC triggering release threshold $Th_{release}$ may be configured like "$O_{fp}+O_{cp}+Off-O_{fn}-O_{cn}$". Equation 13 below shows an IDC release triggering condition using the A3 event trigging threshold.

$$M_n - M_p < Th_{release} \quad \text{[Equation 12]}$$

In Equation 13, $M_n$ is a measurement result not considering IDC interference in a neighbor cell, $M_p$ is a measurement result considering IDC interference in a primary serving cell, and $Th_{release}$ is an IDC triggering release threshold.

Referring to Equation 13, UE performs IDC release triggering in a corresponding frequency band if a difference between the measurement result not considering IDC interference $M_n$ in a neighbor cell and the measurement result considering IDC interference $M_p$ in a primary serving cell is less than the IDC triggering release threshold $Th_{release}$.

Furthermore, a hysteresis margin may be added to the IDC release triggering condition. Equation 14 below shows an IDC release triggering condition in which the hysteresis margin is taken into consideration.

$$M_n - M_p + \text{Hys} < Th_{release} \quad \text{[Equation 14]}$$

In Equation 14, $M_n$ is a measurement result not considering IDC interference in a neighbor cell, $M_p$ is a measurement result considering IDC interference in a primary serving cell, $Th_{release}$ is an IDC triggering release threshold, and Hys is a hysteresis margin.

Referring to Equation 14, if a value in which the hysteresis margin Hys is added to a difference between the measurement result not considering IDC interference $M_n$ in a neighbor cell and the measurement result considering IDC interference $M_p$ in a primary serving cell is smaller than the IDC triggering release threshold $Th_{release}$, the UE performs IDC release triggering.

In another embodiment of the present invention, if a serving cell in which IDC interference is generated is a secondary serving cell, an A6 event trigging threshold may be used as the IDC triggering threshold. A condition that the release of an A6 event is triggered (i.e., Equation 10) is used.

In accordance with the present invention, the IDC triggering release threshold may be configured using offset values (i.e., $O_{cn}$, $O_{cs}$, and Off) that trigger an A6 event. For example, the IDC triggering release threshold $Th_{release}$ may be configured like "$O_{cs}+Off-O_{cn}$". Equation 15 below shows an IDC release triggering condition using an A6 event trigging threshold.

$$M_n - M_s < Th_{release} \quad \text{[Equation 15]}$$

In Equation 15, $M_n$ is a measurement result not considering IDC interference in a is neighbor cell, $M_s$ is a measurement result considering IDC interference in a secondary serving cell, and $Th_{release}$ is an IDC triggering release threshold.

Referring to Equation 15, if a difference between the measurement result not considering IDC interference $M_n$ in the neighbor cell and the measurement result considering IDC interference $M_s$ in the secondary serving cell is less than the IDC triggering release threshold $Th_{release}$, the UE performs IDC release triggering in a corresponding frequency band.

Furthermore, a hysteresis margin may be added to the IDC release triggering condition. Equation 16 below shows an IDC release triggering condition in which the hysteresis margin has been taken into consideration.

$$M_n - M_s + \text{Hys} < Th_{release} \quad \text{[Equation 16]}$$

In Equation 16, $M_n$ is a measurement result not considering IDC interference in a neighbor cell, $M_s$ is a measurement result considering IDC interference in a secondary serving cell, $Th_{release}$ is an IDC triggering release threshold, and Hys is a hysteresis margin.

Referring to Equation 16, if a value in which the hysteresis margin Hys is added to a difference between the measurement result not considering IDC interference in a neighbor cell $M_n$ and the measurement result considering IDC interference in a secondary serving cell $M_s$ is smaller than the IDC triggering release threshold $Th_{release}$, UE performs IDC release triggering.

In another embodiment of the present invention, if a measurement result considering IDC interference in a serving cell is determined to be greater than the IDC triggering threshold based on only a measurement result considering IDC interference in the serving cell, UE may trigger an event indicating that a frequency band determined to be difficult to be used due to IDC interference may be reused.

For another example, UE may trigger an event indicating that a frequency band determined to be difficult to be used due to IDC interference may be reused based on only a measurement result not considering IDC interference in a neighbor cell.

The UE reports updated measurement report information, including the measurement results and IDC interference indication, to the BS as step S1550. Here, information on an unusable frequency band may be information updated after the ICO scheme has been performed. The IDC interference indication may include information on an unusable frequency band due to IDC interference and information on a TDM pattern that is available in a corresponding frequency. The measurement report information may further include a release report indicating that the progress of IDC interference on an unusable frequency band has been finished.

If ICO is further necessary subsequently, the BS may select the most appropriate ICO scheme based on the measurement result and the IDC interference indication and transfers the selected ICO scheme to the UE (not shown).

In another embodiment of the present invention, the process of transmitting the UE capability information at step S1500 may be omitted. Although UE does not transmit an IDC interference existence possibility, a potential frequency band, or ICO support indication to the BS, the BS may know the capabilities of UE implicitly.

For example, at step S1525 or S1550, the UE transmits the measurement report information, including IDC interference indication and a measurement result, to the BS irrespective of whether IDC interference exists or not. That is, although the UE does not support IDC interference, information related to IDC interference is included in the measurement report message. In this case, the information related to IDC interference may include a specific is value not related to an actual value or unnecessary values.

For another example, at step S1525 or S1550, the UE transmits IDC interference indication to the BS. If the IDC interference indication is "TRUE", that is, only when IDC interference is present, the UE includes information related to IDC interference in a measurement result report message and transmits the measurement result report message to the BS.

For another example, the UE may transmit information on whether an IDC existence possibility included in UE capability information is present or information on a frequency band including an IDC existence possibility to the BS through the RRC reconfiguration-complete message at step S1510. Furthermore, the UE may transmit information on a frequency band including potential IDC interference, although it is determined not to include an IDC existence possibility, to the BS through the RRC reconfiguration-complete message. The UE may include information related to IDC interference in the RRC reconfiguration-complete message and report a measurement result, and the BS may receive the information related to IDC interference.

For another example, a BS may transmit configuration information (e.g., an IDC triggering threshold) for performing measurement using system information to UE. The initial configuration operation of the UE is performed using the system information transmitted by the BS. The triggering threshold may be included in a System Information Block (SIB).

Figure 17:
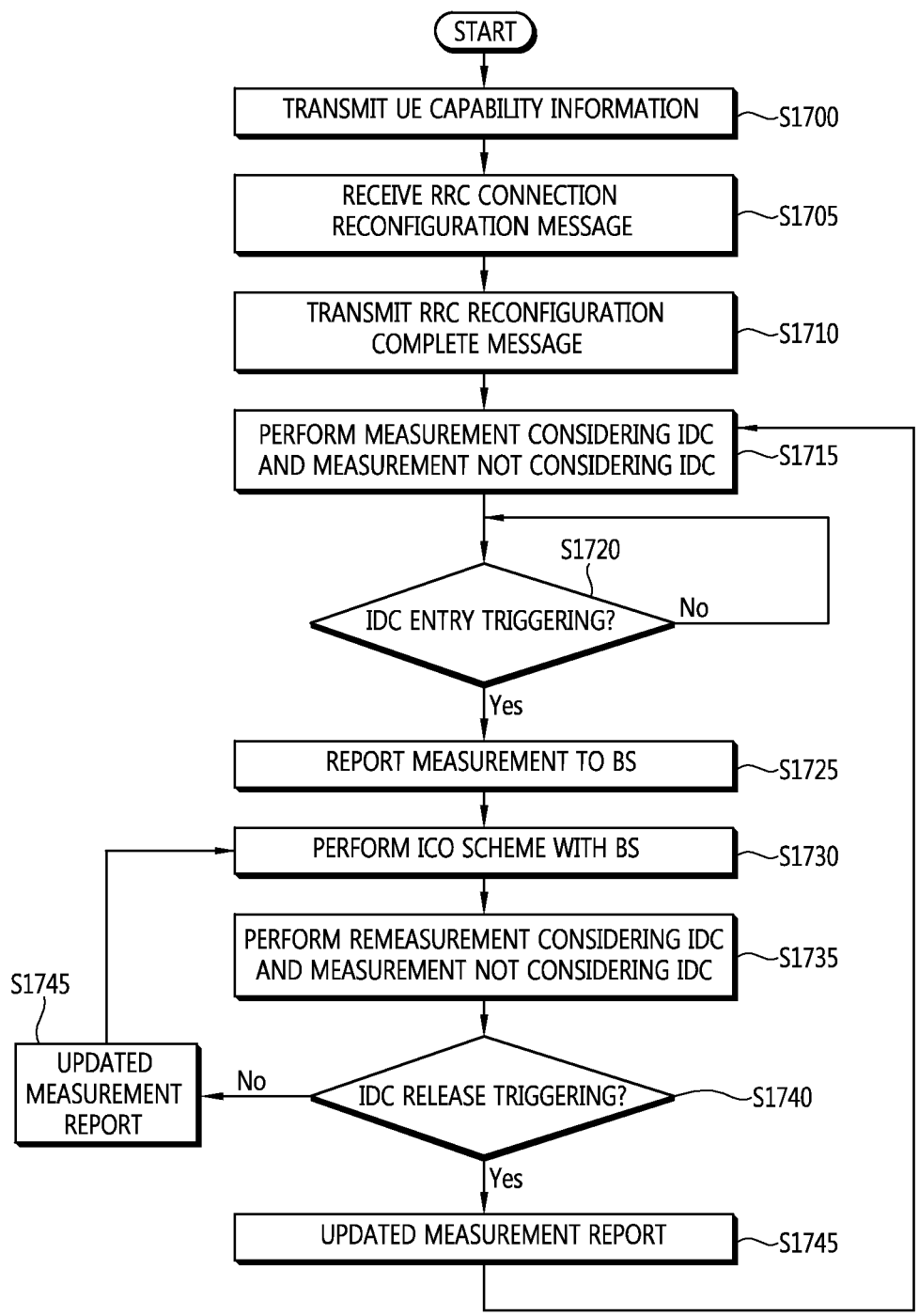
FIG. 17 is a flowchart illustrating the operation of UE for controlling IDC interference in accordance with the present invention.

FIG. 17 is a flowchart illustrating the operation of UE for controlling IDC interference in accordance with the present invention.

Referring to FIG. 17, the UE transmits UE capability information to a BS at step S1700. The UE capability information includes information on whether an IDC existence possibility is present or not, information on a frequency band including an IDC existence is possibility, information on a frequency band not including an IDC existence possibility, or information on a frequency band including potential IDC interference. The UE capability information may further include information on the ISM performance of the UE. The UE capability information may further include ICO support indication. In some embodiments, the transmission of the UE capability information may be omitted.

The UE receives an RRC connection reconfiguration message from the BS at step S1705. The RRC connection reconfiguration message includes information (e.g., an IDC triggering threshold) on which measurement performed by the UE is configured. The IDC triggering threshold may be a threshold used in a measurement configuration, in particular, a threshold related to inter-frequency measurement. That is, event trigging thresholds used for mobility may be used as the IDC triggering threshold irrespective of IDC. For example, if a serving cell is a primary serving cell, the IDC triggering threshold is a threshold related to the triggering of the A3 event. If a serving cell is a secondary serving cell, the IDC triggering threshold is a threshold related to the triggering of the A6 event.

The RRC connection reconfiguration message may further include report IDC quantity. The report IDC quantity may indicate that a TDM pattern, an unusable frequency band, or an additional measurement result (e.g., an additional report on measurement considering IDC interference) should be reported.

The UE transmits an RRC reconfiguration-complete message to the BS at step S1710. The RRC reconfiguration-complete message may include acknowledgement for the reception of the RRC connection reconfiguration message.

The UE performs measurement considering integration interference (i.e., the sum of IDC interference, inter-cell interference, and thermal noise) in addition to IDC interference in a serving cell or a neighbor cell in which IDC interference is generated and performs measurement not considering IDC interference in a serving cell or a neighbor cell in which IDC interference is not generated at step S1715. The UE calculates a measurement result according to the internal coordination of the UE using measurement samples including the influence of the integration interference and measurement samples including the influence of the inter-cell interference and the thermal noise.

If a triggering condition is satisfied, the UE performs IDC entry triggering on a usable frequency band at step S1720. For example, if a difference between a measurement result considering IDC interference in a serving cell or a neighbor cell in which IDC interference is generated and a measurement result not considering IDC interference in a serving cell or a neighbor cell in which IDC interference is not generated is greater than an IDC triggering entry threshold, the UE perform the IDC entry triggering. For another example, a hysteresis margin may be added to the IDC entry triggering condition. If a value in which a difference between the measurement result considering IDC interference and the measurement result not considering IDC interference is added to the hysteresis margin is greater than the IDC triggering entry threshold, the UE performs IDC entry triggering.

The UE reports measurement report information, including the measurement results and IDC interference indication, to the BS at step S1725. The IDC interference indication may indicate that IDC interference is on going in a specific frequency band of the UE and indicate that IDC entry triggering is performed. The measurement report information may be included in the measurement report message.

The measurement report information may include information on an unusable frequency band due to IDC interference and information on a TDM pattern that is available in a corresponding frequency band. In accordance with the present invention, an unusable frequency band may be defined as two types. A frequency band in which communication is not smooth because IDC interference is on going in UE may be defined as an unusable frequency (i.e., a first type), or if the intensity of integration interference is large enough to perform IDC entry triggering although it is not an on-going IDC interference state, a corresponding frequency band is defined as an unusable frequency (i.e., a second type). The information on an unusable frequency band may include information on the range of a frequency band. In some embodiments, the information on an unusable frequency band may include frequency band indication that is used within an LTE band. In some embodiments, the information on an unusable frequency band may include absolute frequency indication that is used within an LTE band. In some embodiments, the information on an unusable frequency band may include a cell index.

The measurement report information may include only a measurement result for a part without IDC influence. In some embodiments, the measurement report information may include both a measurement result for a part without IDC influence and a measurement result for a part with IDC influence. In some embodiments, the measurement report information may include a difference between a measurement result for a part without IDC influence and a measurement result for a part with IDC influence. The measurement report information may further include information on the type of unusable frequency band (i.e., information on whether an unusable frequency band is the first type or the second type).

The UE receives an ICO scheme selected by the BS at step S1730. The ICO scheme is performed between the BS and the UE. Here, the ICO scheme may be an FDM operation or a TDM operation. The FDM operation may be performed through an RRC connection reconfiguration. The TDM operation may indicate a TDM pattern, or the TDM operation may be performed through a DRX reconfiguration. Furthermore, the FDM operation or the TDM operation may be an operation according to FIGS. 5 to 13.

The UE performs measurement in which integration interference considering IDC interference in a serving cell or a neighbor cell in which the IDC interference is generated is taken into account and measurement not considering IDC interference in a serving cell or a neighbor cell in which IDC interference is not generated at step S1735. The UE calculates a measurement result according to UE-internal coordination using measurement samples at a part with IDC influence and measurement samples at a part without IDC influence.

The UE performs IDC release triggering, indicating that an on-going IDC interference state for an unusable frequency band has been finished, based on the measurement result at step S1740. For example, if a difference between a measurement result considering IDC interference in a serving cell and a measurement result not considering IDC interference in a neighbor cell in relation to an unusable frequency band is smaller than an IDC triggering release threshold in an on-going IDC interference state, the UE perform IDC release triggering. For another example, a hysteresis margin is added to the IDC release triggering condition. If a value obtained by subtracting the hysteresis margin from a difference between a measurement result considering IDC interference and a measurement result not considering IDC interference is smaller than the IDC triggering release threshold, the UE performs IDC release triggering. For yet another example, if triggering is determined based on only a measurement result considering IDC interference in a serving cell and the measurement result considering IDC interference in the serving cell is greater than the IDC triggering release threshold, the UE performs IDC release triggering. For yet another example, the UE performs IDC release triggering based on only the measurement result not considering IDC interference.

The UE reports updated measurement report information, including the measurement result and IDC interference indication, to the BS at step S1745. Here, the information on an unusable frequency band is information updated after the ICO scheme has been performed. The measurement report information may further include a release report indicating that the progress of IDC interference for an unusable frequency band has been finished.

If ICO is further necessary subsequently, the UE may receive an ICO scheme selected by the BS and repeats an operation of performing the ICO scheme at step S1730.

Figure 18:
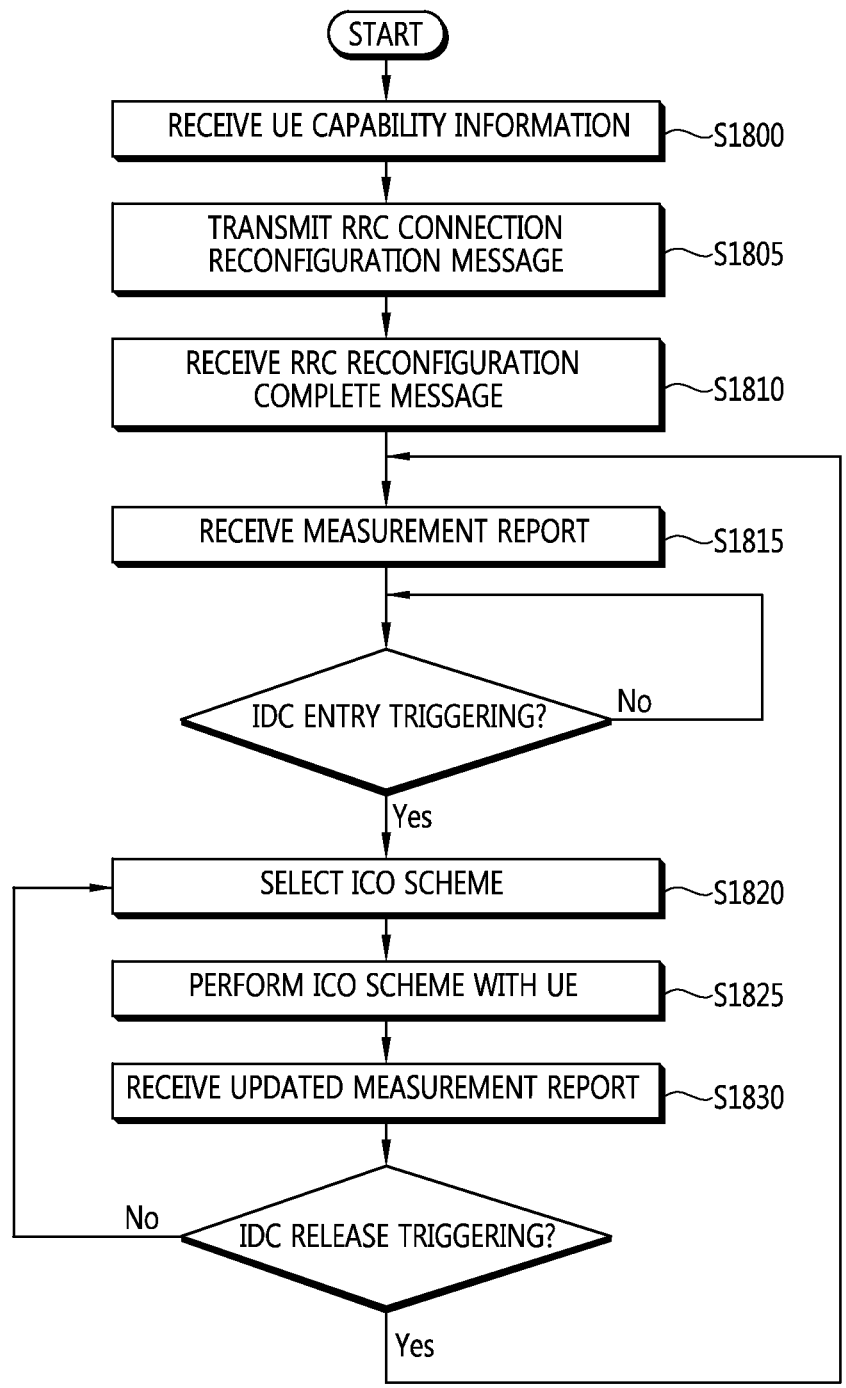
FIG. 18 is a flowchart illustrating the operation of a BS for controlling IDC interference in accordance with the present invention.

FIG. 18 is a flowchart illustrating the operation of a BS for controlling IDC interference in accordance with the present invention.

Referring to FIG. 18, the BS receives UE capability information from UE at step S1800. The UE capability information includes information on whether an IDC existence possibility is present or not, information on a frequency band including an IDC existence possibility, information on a frequency band not including an IDC existence possibility, or information on a frequency band including potential IDC interference. The UE capability information may further include information on the ISM performance of the UE. The UE capability information may further include ICO support indication.

The BS transmits an RRC connection reconfiguration message to the UE at step S1805. The RRC connection reconfiguration message includes information (e.g., an IDC triggering threshold) on which measurement performed by the UE is configured. The IDC triggering threshold may be a threshold used in a measurement configuration, in particular, a threshold related to inter-frequency measurement. For example, if a serving cell is a primary serving cell, the IDC triggering threshold is a threshold related to the triggering of the A3 event. If a serving cell is a secondary serving cell, the IDC triggering threshold is a threshold related to the triggering of the A6 event.

The RRC connection reconfiguration message may further include report IDC quantity. The report IDC quantity may indicate that a TDM pattern, an unusable frequency band, or an additional measurement result (e.g., an additional report on measurement considering IDC interference) should be reported.

The BS receives an RRC reconfiguration-complete message from the UE at step S1810. The RRC reconfiguration-complete message may include acknowledgement for the reception of the RRC connection reconfiguration message.

The BS receives measurement report information, including a measurement result for measurement in which integration interference including IDC interference in a serving cell or a neighbor cell, performed by the UE, has been taken into consideration and measurement not considering IDC interference in a serving cell or a neighbor cell in which IDC interference is not generated and IDC interference indication, from the UE at step S1815. The measurement result is a result of measurement performed according to the internal coordination of the UE using measurement samples in a serving cell or a neighbor cell including the influence of integration interference (i.e., the sum of IDC interference, inter-cell interference, and thermal noise) and measurement samples in a serving cell or a neighbor cell including only the influence of inter-cell interference and thermal noise. The IDC interference indication may indicate that IDC interference is on going in a specific frequency band of the UE and indicates that IDC entry triggering is performed. The measurement report information may be included in the measurement report message.

The measurement report information may include information on an unusable frequency band due to IDC interference and information on a TDM pattern that is available in a corresponding frequency band. The unusable frequency band may be any one of a frequency band in which communication is not smooth because IDC interference is on going in UE (i.e., a first type) and a frequency band in which the intensity of integration interference is large enough to perform IDC entry triggering although it is not an on-going IDC interference state (i.e., a second type). Information on the unusable frequency band may include information on the range of a frequency band. In some embodiments, the information on an unusable frequency band may include frequency band indication that is used within an LTE band. In some embodiments, the information on an unusable frequency band may include absolute frequency indication that is used within an LTE band. In some embodiments, the information on an unusable frequency band may include a cell index.

The measurement report information may include only a measurement result for a part without IDC influence. In some embodiments, the measurement report information may include both a measurement result for a part without IDC influence and a measurement result for a part with IDC influence. In some embodiments, the measurement report information may include a difference between a measurement result for a part without IDC influence and a measurement result for a part with IDC influence. Meanwhile, the measurement report information may further include information on the type of unusable frequency band (i.e., information on whether an unusable frequency band is the first type or the second type).

If the IDC interference indication indicates that IDC entry triggering is performed, the BS selects the most appropriate ICO scheme based on the measurement report information at step S51820. The BS transfers the ICO scheme to the UE, and thus the ICO scheme is performed between the BS and the UE at step S1825. Here, the ICO scheme may be an FDM operation or a TDM operation. The FDM operation may be performed through an RRC connection reconfiguration. The TDM operation may indicate a TDM pattern, or the TDM operation may be performed through a DRX reconfiguration. Furthermore, the FDM operation or the TDM operation may be an operation according to FIGS. 5 to 13.

The BS receives updated measurement report information from the UE at step S1830. Here, the information on an unusable frequency band is information updated after the ICO scheme has been performed. The measurement report information may further include a release report indicating that the progress of IDC interference for an unusable frequency band has been finished.

If the IDC interference indication indicates that IDC release triggering has not been performed, that is, ICO is further necessary, the BS may repeat an operation of selecting a proper ICO scheme again at step S1820, transferring the selected ICO scheme to the UE, and performing the ICO scheme at step S1825.

Figure 19:
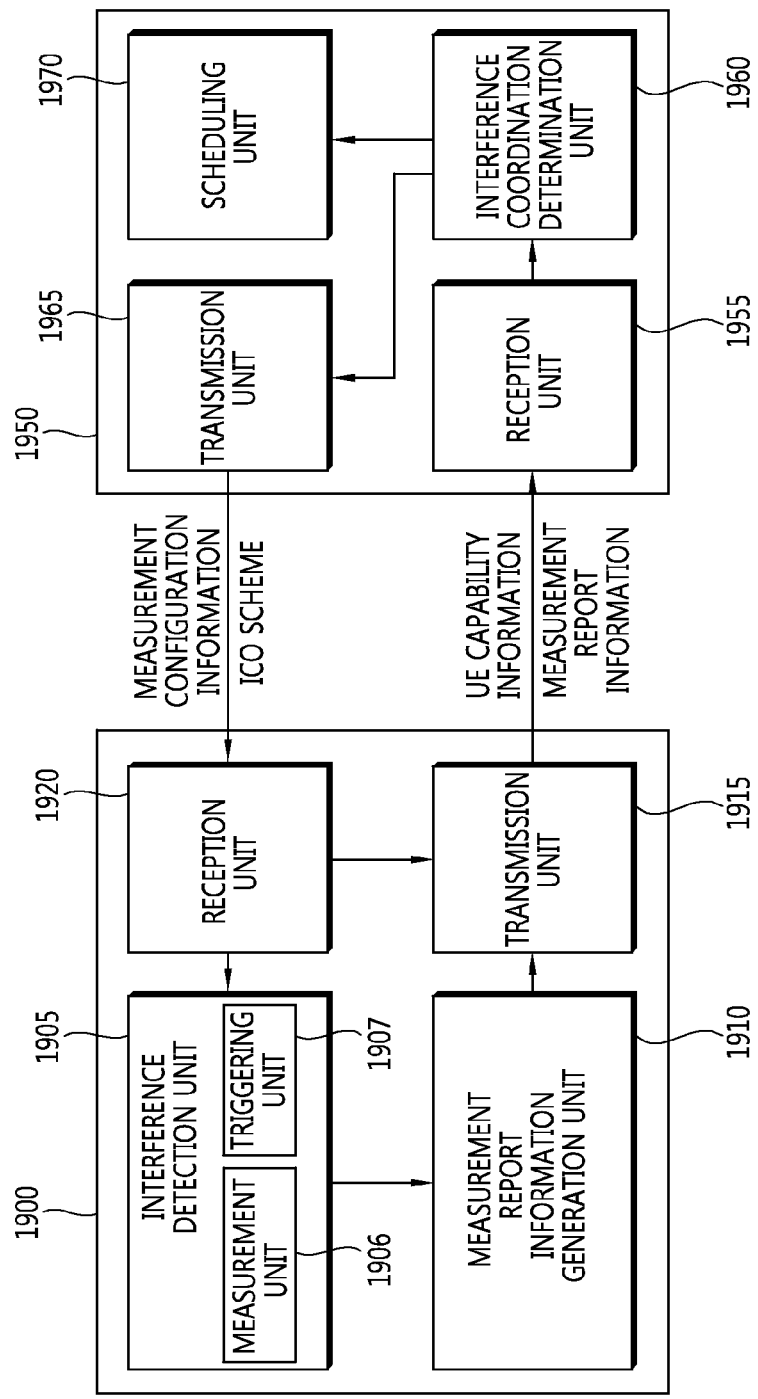
FIG. 19 is a block diagram of an apparatus for transmitting and receiving information on IDC interference in accordance with an example of the present invention.

FIG. 19 is a block diagram of an apparatus for transmitting and receiving information on IDC interference in accordance with an example of the present invention.

Referring to FIG. 19, UE 1900 and a BS 1950 exchanges pieces of information on IDC interference. The information on IDC interference includes support information transmitted by the UE 1900 and response information transmitted by the BS 1950.

The UE 1900 includes an interference detection unit 1905, a measurement report information generation unit 1910, a transmission unit 1915, and a reception unit 1920.

The interference detection unit 1905 detects the occurrence of IDC interference. For example, the interference detection unit 1905 detects the occurrence of IDC interference when the UE transmits a signal y through another RF, such as WiFi, while the UE 1900 receives a signal x from the BS 1950 through an LTE RF.

The interference detection unit 1905 includes a measurement unit 1906 and a triggering unit 1907. The measurement unit 1906 performs measurement in which integration interference considering IDC interference in a serving cell or a neighbor cell has been taken into consideration and measurement not considering IDC interference in a serving cell or a neighbor cell in which IDC interference is not generated. The measurement unit 1906 separately performs measurement using measurement samples at a part with IDC influence and measurement using measurement samples at a part without IDC influence. In particular, the measurement sample at a part with IDC influence is a measurement sample at a part including the influence of integration interference. The measurement unit 1906 performs measurement based on measurement configuration information received from the BS.

The triggering unit 1907 triggers an event, indicating that an on-going IDC interference state for a usable frequency band has been started or that IDC interference for an unusable frequency band has been finished, if a triggering condition (i.e., IDC entry triggering or IDC release triggering) is satisfied based on an IDC triggering threshold received from the BS. If a serving cell is a primary serving cell, the IDC triggering threshold may be a threshold related to the triggering of the A3 event. If a serving cell is a secondary serving cell, the IDC triggering threshold may be a threshold related to the triggering of the A6 event.

The measurement report information generation unit 1910 generates measurement report information including IDC interference indication and a measurement result. The IDC interference indication indicates that IDC triggering has been performed, and the measurement report information may include information on an unusable frequency band due to IDC interference and information on a TDM pattern that is available in the corresponding frequency band. The unusable frequency band may be any one of a frequency band in which communication is not smooth because IDC interference is on going in UE (i.e., a first type) and a frequency band in which the intensity of integration interference is large enough to perform IDC entry triggering although it is not an on-going IDC interference state (i.e., a second type). The measurement report information may include only a measurement result for a part without IDC influence. In some embodiments, the measurement report information may include both a measurement result for a part without IDC influence and a measurement result for a part with IDC influence. In some embodiments, the measurement report information may include a measurement result for a part without IDC influence and a difference between the measurement result for a part without IDC influence and a measurement result for a part with IDC influence. The measurement report information may further include information on the type of unusable frequency band (i.e., information indicating whether an unusable frequency band is the first type or the second type).

The measurement report information generation unit 1910 generates updated measurement report information if information that forms the measurement report information is updated.

The transmission unit 1915 transmits measurement report information generated by the measurement report information generation unit 1910 and UE capability information to the BS 1950. The UE capability information includes information on whether an IDC existence possibility is present or not, information on a frequency band including an IDC existence possibility, information on a frequency band not including an IDC existence possibility, or information on a frequency band that is determined not to include an IDC existence possibility, is but to include potential IDC interference.

The transmission unit 1915 transmits updated measurement report information back to the BS 1950 if measurement report information is updated.

The reception unit 1920 receives measurement configuration information from the BS 1950. The measurement configuration information may include a threshold for configuring an IDC triggering condition. The measurement configuration information may be included in an RRC connection reconfiguration message and transmitted.

Furthermore, the reception unit 1920 receives an ICO scheme, determined by the BS 1950, from the BS 1950.

The BS 1950 includes a reception unit 1955, an interference coordination determination unit 1960, a transmission unit 1965, and a scheduling unit 1970.

The reception unit 1955 receives UE capability information and measurement report information from the UE 1900.

The interference coordination determination unit 1960 determines an ICO scheme based on measurement report information received from the UE 1900. The ICO scheme may be an FDM operation or a TDM operation. Furthermore, the FDM operation or the TDM operation may be an operation according to FIGS. 5 to 13.

The transmission unit 1965 transmits measurement configuration information for configuring the measurement of the UE 1900 to the UE 1900 through an RRC connection reconfiguration message.

Furthermore, the transmission unit 1965 transmits an ICO scheme, determined by the interference coordination determination unit 1960, to the UE 1900.

The scheduling unit 1970 performs an ICO scheme according to an FDM operation or a TDM operation based on the determination of the interference coordination determination unit 1960. The FDM operation may be performed through an RRC connection reconfiguration. The TDM operation may indicate a TDM pattern, or the TDM operation may be performed through a DRX reconfiguration.

The BS 1950 may further include a measurement configuration information generation unit (not shown) for generating measurement configuration information on which measurement performed by UE is configured. The measurement configuration information may include a threshold for configuring an IDC triggering condition. The measurement configuration information may be included in an RRC connection reconfiguration message and transmitted.

The above description is only an example of the technical spirit of the present invention, and those skilled in the art may change and modify the present invention in various ways without departing from the intrinsic characteristic of the present invention. Accordingly, the disclosed embodiments should not be construed as limiting the technical spirit of the present invention, but should be construed as illustrating the technical spirit of the present invention. The scope of the technical spirit of the present invention is not restricted by the embodiments, and the scope of the present invention should be interpreted based on the appended claims. Accordingly, the present invention should be construed as covering all modifications or variations induced from the meaning and scope of the appended claims and their equivalents.

The invention claimed is:

1. A method of user equipment controlling In-Device Coexistence (IDC) interference in a wireless communication system, the method comprising:
receiving measurement configuration information, comprising an IDC triggering threshold used as a condition that an IDC event indicating that an on-going IDC interference state has started is triggered, from a base station;
performing measurement considering IDC influence in a serving cell and measurement not considering IDC influence in a neighbor cell based on the measurement configuration information;
triggering the IDC event if a difference between a result of the measurement considering IDC influence and a result of the measurement not considering IDC influence is greater than the IDC triggering threshold; and
transmitting measurement report information, comprising IDC indication indicating whether the IDC event has been triggered or not and the result of the measurement considering IDC influence or the result of the measurement not considering IDC influence, to the base station,
wherein performing the measurement considering IDC influence in the serving cell comprises:
performing measurement based on measurement samples in which integration interference, including all IDC interference, inter-cell interference, and thermal noise in the serving cell, is taken into consideration, and
performing the measurement not considering IDC influence in the neighbor cell comprises performing measurement based on measurement samples in which inter-cell interference and thermal noise in the neighbor cell are taken into consideration.

2. The method of claim 1, wherein:
if the serving cell is a primary serving cell, the IDC triggering threshold is a threshold related to the triggering of an A3 event, and
if the serving cell is a secondary serving cell, the IDC triggering threshold is a threshold related to the triggering of an A6 event.

3. The method of claim 1, wherein the measurement report information further comprises information on an unusable frequency that is a frequency band in which communication is not smooth due to on-going IDC interference.

4. The method of claim 3, wherein the information on the unusable frequency comprises information on a frequency band on which IDC entry triggering is performed based on an intensity of the integration interference, including all IDC interference, inter-cell interference, and thermal noise.

5. The method of claim 4, wherein the measurement report information further comprises type information indicating whether the information on the unusable frequency is determined based on the intensity of the integration interference.

6. The method of claim 1, wherein triggering the IDC event comprises triggering the IDC event, if a value obtained by subtracting a hysteresis value from the difference between the result of the measurement considering IDC influence and the result of the measurement not considering IDC influence is greater than the IDC triggering threshold.

7. A method of a base station controlling In-Device Coexistence (IDC) interference in a wireless communication system, the method comprising:
transmitting measurement configuration information, comprising an IDC triggering threshold used as a condition that an IDC event indicating that an on-going IDC interference state has started is triggered, to user equipment;
receiving measurement report information, comprising IDC indication indicating whether the IDC event has been triggered or not and a result of measurement considering IDC influence, performed in a serving cell, or a result of measurement not considering IDC influence, performed in a neighbor cell from the user equipment;
determining an In-device Coexistence interference coordination (ICO) scheme based on the measurement report information; and transmitting the ICO scheme to the user equipment;
transmitting the ICO scheme to the user equipment; and
receiving user equipment capability information, comprising at least one of an IDC existence possibility, a frequency band including possible IDC existence, and ICO support indication indicating whether or not the user equipment has a capability to control IDC interference, from the user equipment, before transmitting the measurement configuration information to the user equipment, wherein the measurement configuration information is generated based on the user equipment capability information.

8. The method of claim 7, wherein:
if the serving cell is a primary serving cell, the IDC triggering threshold is a threshold related to the triggering of an A3 event, and
if the serving cell is a secondary serving cell, the IDC triggering threshold is a threshold related to the triggering of an A6 event.

9. The method of claim 7, wherein the measurement configuration information further comprises report IDC quantity indicating that the measurement report information is configured to include IDC-related information.

10. User equipment for controlling In-Device Coexistence (IDC) interference in a wireless communication system, the user equipment comprising:
a reception unit configured to receive measurement configuration information, comprising an IDC triggering threshold used as a condition that an IDC event indicating that an on-going IDC interference state has started is triggered, from a base station;
a measurement unit configured to perform measurement considering IDC influence in a serving cell and measurement not considering IDC influence in a neighbor cell based on the measurement configuration information;
a triggering unit configured to trigger the IDC event if a difference between a result of the measurement considering IDC influence and a result of the measurement not considering IDC influence is greater than the IDC triggering threshold; and
a transmission unit configured to transmit measurement report information, comprising IDC indication indicating whether the IDC event has been triggered or not and the result of the measurement considering IDC influence or the result of the measurement not considering IDC influence, to the base station,
wherein the measurement unit performs the measurement considering IDC influence in the serving cell based on measurement samples in which integration interference, including all IDC interference, inter-cell interference, and thermal noise in the serving cell, is taken into consideration and performs the measurement not considering IDC influence in the neighbor cell based on measurement samples in which inter-cell interference and thermal noise in the neighbor cell are taken into consideration.

11. The user equipment of claim 10, wherein: if the serving cell is a primary serving cell, the IDC triggering threshold is a threshold related to the triggering of an A3 event, and if the serving cell is a secondary serving cell, the IDC triggering threshold is a threshold related to the triggering of an A6 event.

12. The user equipment of claim 10, wherein the transmission unit transmits the measurement report information, further comprising information on an unusable frequency that is a frequency band in which communication is not smooth due to on-going IDC interference, to the base station.

13. The user equipment of claim 10, wherein the transmission unit transmits information on an unusable frequency, comprising information on a frequency band on which IDC entry triggering is performed based on an intensity of the integration interference, including all IDC interference, inter-cell interference, and thermal noise, to the base station.

14. The user equipment of claim 13, wherein the transmission unit transmits the measurement report information, further comprising type information indicating whether or not the information on the unusable frequency is determined based on the intensity of the integration interference, to the base station.

15. The user equipment of claim 10, wherein the triggering unit triggers the IDC event, if a value obtained by subtracting a hysteresis value from the difference between the result of the measurement considering IDC influence and the result of the measurement not considering IDC influence is greater than the IDC triggering threshold.

16. A base station for controlling In-Device Coexistence (IDC) interference in a wireless communication system, the base station comprising:
a transmission unit configured to transmit measurement configuration information, comprising an IDC triggering threshold used as a condition that an IDC event indicating that an on-going IDC interference state has started is triggered, to user equipment;
a reception unit configured to receive measurement report information, comprising IDC indication indicating whether the IDC event has been triggered or not and a result of measurement considering IDC influence, performed in a serving cell, or a result of measurement not considering IDC influence, performed in a neighbor cell from the user equipment; and
an interference coordination determination unit configured to determine an In-device Coexistence interference coordination (ICO) scheme based on the measurement report information,
wherein the reception unit is configured to receive user equipment capability information, comprising at least one of an IDC existence possibility, a frequency band including possible IDC existence, and ICO support indication indicating whether or not the user equipment has a capability to control IDC interference, from the user equipment, before transmitting the measurement configuration information to the user equipment, wherein the measurement configuration information is generated based on the user equipment capability information.

17. The base station of claim 16, wherein: if the serving cell is a primary serving cell, the IDC triggering threshold is a threshold related to the triggering of an A3 event, and if the serving cell is a secondary serving cell, the IDC triggering threshold is a threshold related to the triggering of an A6 event.

* * * * *